United States Patent
Wood et al.

(10) Patent No.: US 11,829,961 B1
(45) Date of Patent: Nov. 28, 2023

(54) SMART CONTRACT GENERATION AND EXECUTION IN A DISTRIBUTED LEDGER ENVIRONMENT

(71) Applicant: Liberty Mutual Insurance Company, Boston, MA (US)

(72) Inventors: Marc Wood, Boston, MA (US); Andrew Palmer, Boston, MA (US); Gary DeGruttola, Boston, MA (US); John Louis Pileggi, Jr., Barrington, NH (US)

(73) Assignee: Liberty Mutual Insurance Company, Boston, MA (US)

( * ) Notice: Subject to any disclaimer, the term of this patent is extended or adjusted under 35 U.S.C. 154(b) by 590 days.

(21) Appl. No.: 16/001,506

(22) Filed: Jun. 6, 2018

Related U.S. Application Data

(60) Provisional application No. 62/516,238, filed on Jun. 7, 2017.

(51) Int. Cl.
*G06Q 20/06* (2012.01)
*G06Q 50/18* (2012.01)
*G06Q 40/08* (2012.01)

(52) U.S. Cl.
CPC .............. *G06Q 20/06* (2013.01); *G06Q 40/08* (2013.01); *G06Q 50/188* (2013.01)

(58) Field of Classification Search
CPC ....... G06Q 20/06; G06Q 40/08; G06Q 50/188
See application file for complete search history.

(56) References Cited

U.S. PATENT DOCUMENTS 7,953,615 B2    5/2011    Aquila et al.
8,615,409 B1 *   12/2013   Mckown ................ G06Q 20/14
                                                                      705/2

(Continued)

FOREIGN PATENT DOCUMENTS

EP          0472786 A1      3/1992

OTHER PUBLICATIONS

John Ream et al., "Upgrading blockchains: Smart contract use cases in industry", Jun. 8, 2016, Deloitte University Press, retrieved from https://www2.deloitte.com/us/en/insights/focus/signals-for-strategists/using-blockchain-for-smart-contracts.html (Year: 2016).*

(Continued)

*Primary Examiner* — Sangeeta Bahl
*Assistant Examiner* — Joshua D Schneider
(74) *Attorney, Agent, or Firm* — ALSTON & BIRD LLP

(57) ABSTRACT

An apparatus comprising a communications interface configured to communicate over one or more networks, at least one processor and at least one memory including program code is provided. The at least one memory and the program code configured to, with the processor, cause the apparatus to at least receive, via the communications interface, an interparty transaction request. The interparty transaction request corresponds to an interparty transaction and identifying a first party and a second party. The apparatus generates a smart contract based on the interparty transaction request; stores a data entry indicating the generation of the smart contract to a distributed ledger; executes the smart contract to cause settlement of the interparty transaction between the first party and the second party; and stores a data entry indicating the settlement of the interparty transaction to the distributed ledger.

18 Claims, 12 Drawing Sheets

(56) References Cited

U.S. PATENT DOCUMENTS

| | | | |
|---|---|---|---|
| 8,799,034 B1 | 8/2014 | Brandmaier et al. | |
| 10,719,501 B1* | 7/2020 | Leise | G06Q 10/20 |
| 10,891,694 B1* | 1/2021 | Leise | G07C 5/0866 |
| 2008/0306784 A1* | 12/2008 | Rajkumar | G06Q 50/18 705/342 |
| 2014/0164255 A1* | 6/2014 | Daly | G06Q 50/188 705/80 |
| 2016/0217532 A1 | 7/2016 | Slavin | |
| 2017/0098291 A1* | 4/2017 | Code | G06Q 50/188 |
| 2017/0279774 A1* | 9/2017 | Booz | G06Q 20/123 |
| 2017/0287090 A1* | 10/2017 | Hunn | G06Q 50/18 |
| 2018/0005186 A1* | 1/2018 | Hunn | G06F 40/103 |
| 2018/0089758 A1* | 3/2018 | Stradling | G06F 12/1408 |
| 2018/0096360 A1* | 4/2018 | Christidis | G06Q 20/02 |
| 2018/0174255 A1* | 6/2018 | Hunn | G06Q 10/10 |
| 2018/0248880 A1* | 8/2018 | Sardesai | H04L 63/101 |
| 2018/0285979 A1* | 10/2018 | Chessell | G06Q 40/08 |
| 2018/0315141 A1* | 11/2018 | Hunn | G06F 40/42 |
| 2019/0080284 A1* | 3/2019 | Kim | G06Q 50/28 |
| 2021/0326992 A1* | 10/2021 | Leise | H04L 63/12 |

OTHER PUBLICATIONS

Mike F Robbins, "How to Toggle Field Codes Off or On in Microsoft Word", May 10, 2010, https://mikefrobbins.com/ (Year: 2010).*

Justin Baker, "Is It a Feature Flag or a Feature Toggle?", Apr. 23, 2016, https://launchdarkly.com/blog/is-it-a-feature-flag-or-a-feature-toggle/ (Year: 2016).*

Z/Yen Group, From Slips To Smart Contracts, Intelligent Technology, In The London Wholesale Insurance Market, A Long Finance Report, Jan. 1, 2017, The London Market Group, 66 pages, https://www.zyen.com/.../From_Slips_To_Smart_Contracts_Report_2017.12_Final.pd, Oct. 30, 2018.

Siriyanna, Srinivasa, Blockchain: Blockchain Smart Contracts in Insurance, Jan. 4, 2017, Infosys Limited, 3 pages, http://www.infosysblogs.com/blockchain/2017/01/blockchain_smart_contracts_in_.html, Oct. 30, 2018.

Sia Partners, Global insurance regulation: a new dawn for capital requirements?, Nov. 22, 2015, Banking & Insurance, 5 pages, http://en.finance.sia-partners.com/impact-blockchains-smart-contracts-insurance, Oct. 30, 2018.

Richter, Christian, Digitizing Processes End-to-End with Blockchain—Accenture Insurance Blog, Internet Archive captured between Dec. 15, 2016 to Apr. 6, 2018, 4 pages, http://insuranceblog.accenture.com/digitizing-processes-end-to-end-with-blockchain, Jun. 19, 2017.

Marvin, Rob, Blockchain in 2017: The Year of Smart Contracts, Dec. 12, 2016, PC Magazine, 7 pages, https://www.pcmag.com/article/350088/blockchain-in-2017-the-year-of-smart-contracts, Oct. 30, 2018.

Lorenz, Johannes-Tobias, et al., Blockchain in insurance—opportunity or threat?, Jul. 1, 2016, McKinsey & Company, 9 pages, http://www.mckinsey.com/industries/financial-services/our-insights/blockchain-in-insurance-opportunity-orthreat, Oct. 30, 2018.

* cited by examiner

SMART CONTRACT GENERATION AND EXECUTION IN A DISTRIBUTED LEDGER ENVIRONMENT

CROSS-REFERENCE TO RELATED APPLICATIONS

This application claims priority to U.S. Provisional Appl. No. 62/516,238, filed Jun. 7, 2017, the content of which is hereby incorporated herein in its entirety.

BACKGROUND

Each year, the United States' insurance industry processes billions of dollars in claims subrogation and salvage processing. The processing of claims subrogation and salvage processing is manually intensive and time intensive. The processing is costly due to bank transaction fees. Moreover, during claims subrogation and salvage processing, third parties may have access to secure data.

Accordingly, there is a need in the art for improved methods, apparatuses, systems, computer program products, and/or the like for processing claims subrogation and salvage processing.

BRIEF SUMMARY

Example embodiments provide methods, apparatuses, systems, and computer program products for processing interparty transactions such as claim subrogation and salvage processing. Example embodiments provide a secure platform for creating, negotiating, and resolving interparty transactions such as claims subrogation and salvage claims. In example embodiments, the secure platform may use a private distributed ledger (e.g., blockchain) platform and smart contracts embedded therein to achieve a secure, efficient, and less resource-intensive processing of claim subrogation and salvage processing.

According to an aspect of the present invention, an apparatus is provided. In an example embodiment, the apparatus comprises a communications interface configured to communicate over one or more networks, at least one processor and at least one memory including program code. The at least one memory and the program code are configured to, with the processor, cause the apparatus to at least receive, via the communications interface, an interparty transaction request. The interparty transaction request corresponds to an interparty transaction and identifying a first party and a second party, The at least one memory and the program code are further configured to, with the processor, cause the apparatus to at least generate a smart contract based on the interparty transaction request; store a data entry indicating the generation of the smart contract to a distributed ledger; execute the smart contract to cause settlement of the interparty transaction between the first party and the second party; and store a data entry indicating the settlement of the interparty transaction to the distributed ledger.

According to another aspect of the present invention, a method for automated execution of an interparty transaction via a distributed ledger is provided. In an example embodiment, the method comprises receiving, via a communications interface of a node computing entity comprising the communications interface, a processor, and a memory, an interparty transaction request. The interparty transaction request corresponds to an interparty transaction and identifying a first party and a second party. The node computing entity is a node of the distributed ledger. The method further comprises generating a smart contract based on the interparty transaction request; storing a data entry indicating the generation of the smart contract to the distributed ledger; executing the smart contract to cause settlement of the interparty transaction between the first party and the second party; and storing a data entry indicating the settlement of the interparty transaction to the distributed ledger.

According to yet another aspect of the present invention, a computer program product is provided. In an example embodiment, the computer program product comprises at least one non-transitory computer-readable storage medium having computer-readable program code portions stored therein. The computer-readable program code portions comprising executable portions configured to receive, via a communications interface, an interparty transaction request. The interparty transaction request corresponds to an interparty transaction and identifying a first party and a second party. The computer-readable program code portions comprising executable portions configured to generate a smart contract based on the interparty transaction request; store a data entry indicating the generation of the smart contract to a distributed ledger; execute the smart contract to cause settlement of the interparty transaction between the first party and the second party; and store a data entry indicating the settlement of the interparty transaction to the distributed ledger.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 8:
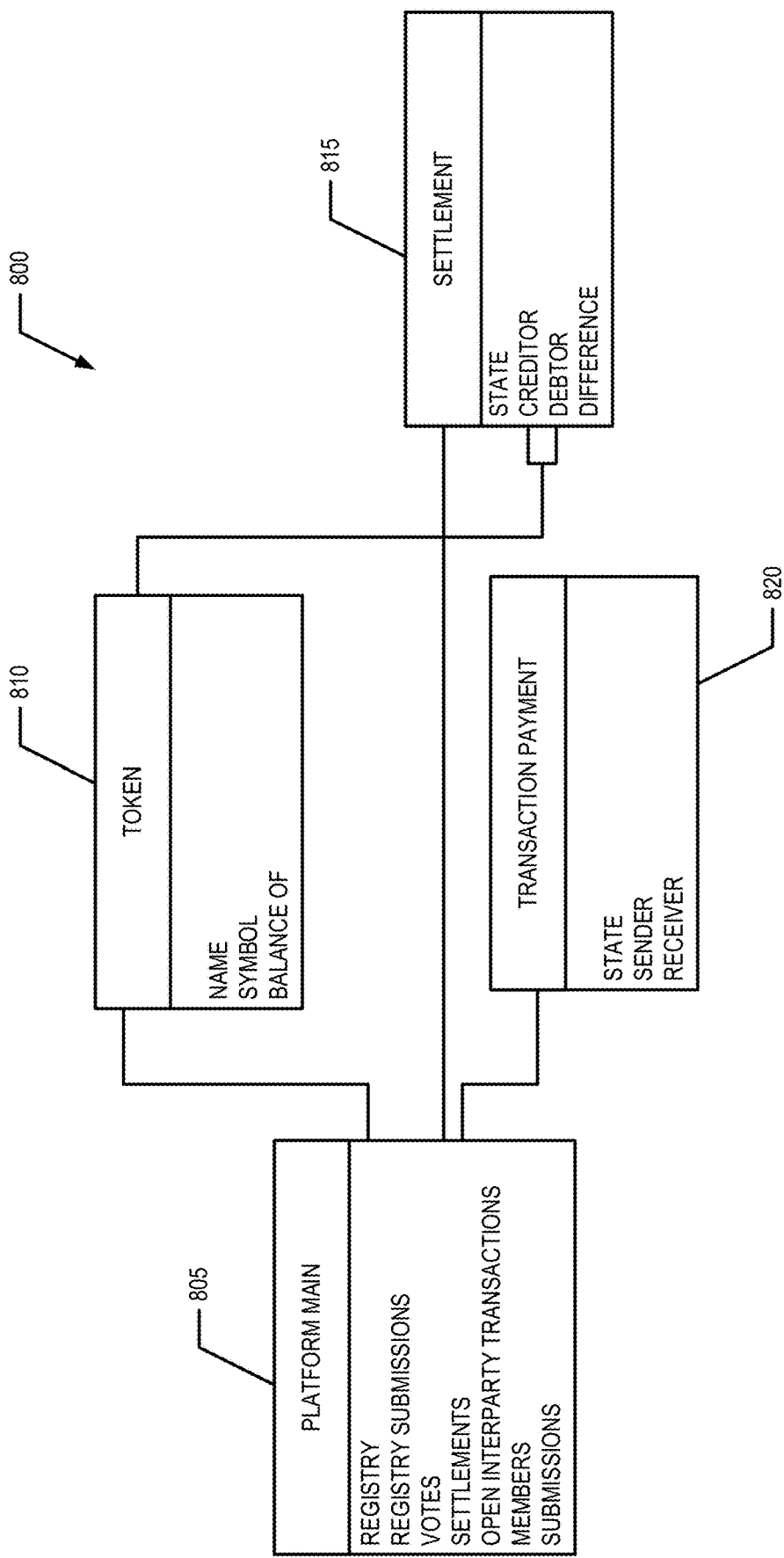
FIG. 8 illustrates an example software architecture of the CSS platform according to one embodiment of the present invention.

FIGS. 8A, 8B, 8C, and 8D illustrate example architectures of portions of the CSS platform illustrated in FIG. 8, according to one embodiment of the present invention.

DETAILED DESCRIPTION OF EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. BRIEF OVERVIEW

Example embodiments of the present invention provide a platform for generating, negotiating, executing, and enforcing interparty transactions. In various embodiments, the generating, negotiating, executing, and/or enforcing of the interparty transaction is performed in an automated manner. Example embodiments of the present invention provide an interparty transaction platform configured for initiating interparty transactions, negotiating interparty transactions between two or more parties, and resolving the interparty transaction. For example, example embodiments of the present invention provide a claim subrogation and salvage (CSS) platform configured for CSS claim creation, negotiation of created CSS claims between the named debtor and creditor parties, and resolution of CSS claims. In an example embodiment, the CSS platform is configured to facilitate and/or process payment of the creditor by the debtor of a resolved claim. In various embodiments, a CSS claim is an example of an interparty transaction that may be registered, validated, negotiated, settled, and/or the like via various embodiments of the present invention. In an example embodiment, the payment may be made using digital assets (e.g., cryptocurrencies). Moreover, the CSS platform secures sensitive information against access by third parties. For example, the CSS platform may comprise a private distributed ledger (e.g., blockchain) platform configured to have smart contracts embedded therein and/or configured to process smart contracts. In an example embodiment, a smart contract is a computer protocol that facilitates, verifies, and/or enforces the negotiation or performance of a contract. In an example embodiment, various contractual clauses of a contract may be partially or fully self-executing, self-enforcing, or both.

Various embodiments of the present invention leverage digital assets (e.g., cryptocurrencies) for use in interparty payments. For example, settlements may be performed using one or more digital assets of the CSS distributed ledger platform. Various embodiments of the present invention leverage smart contracts to manage interparty legal documents. For example, smart contracts may be used to execute and/or enforce various clauses of interparty legal documents. Various embodiments of the present invention leverage electronic identity validation for registering and validating approved users for the creation of interparty transactions, negotiating of interparty transactions, settlement of interparty transactions, and/or the like. Various embodiments of the present invention leverage data encryption to securely store and provide access to information/data relating to interparty transactions. Various embodiments leverage proof of ownership capabilities to confirm salvage of physical assets to an authorized third party.

II. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

Figure 1:
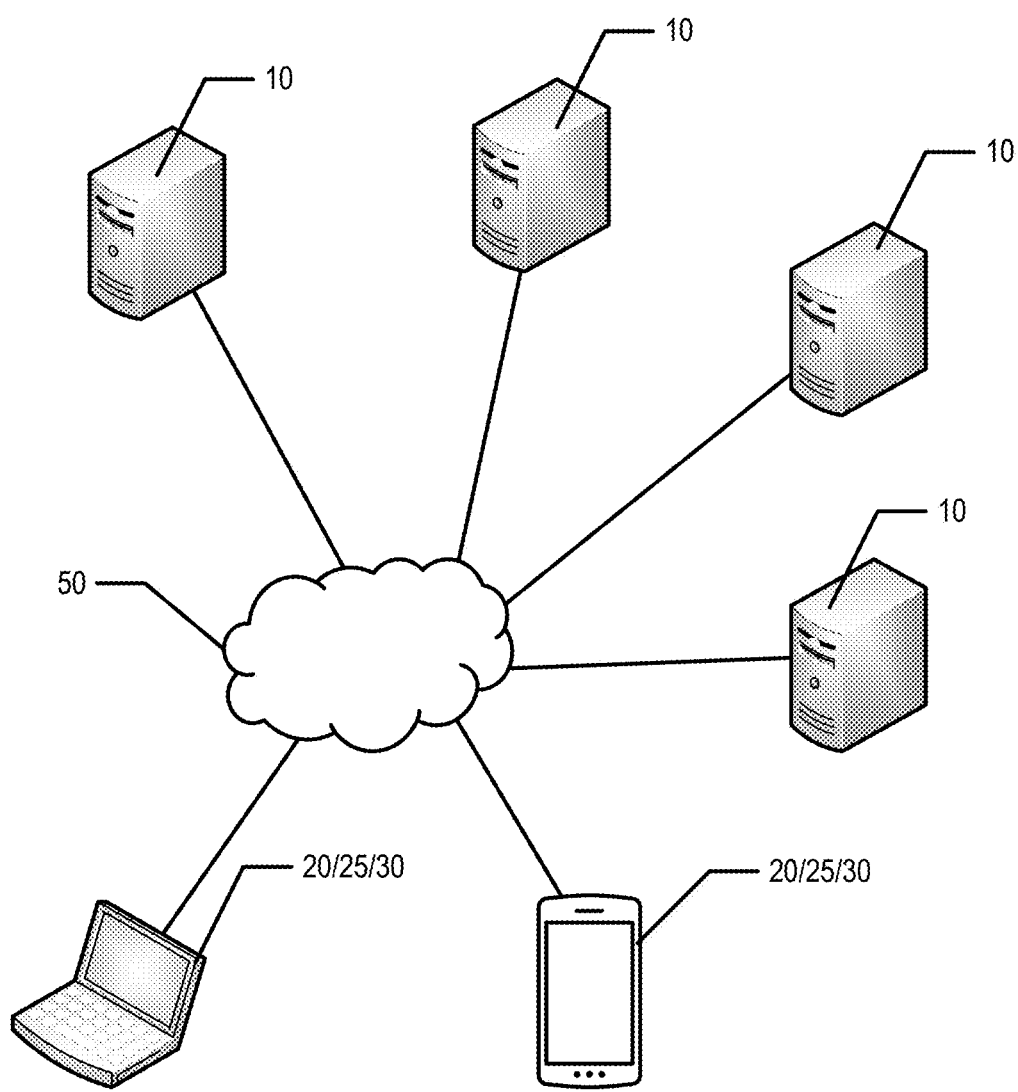
FIG. 1 is an overview of a system that can be used to practice embodiments of the present invention.

FIG. 1 provides an illustration of an exemplary embodiment of the present invention. As shown in FIG. 1, this particular embodiment may include two or more node computing entities 10, one or more user computing entities 30, one or more initiating user computing entities 20, one or more receiving user computing entities 25, one or more networks 50, and/or the like. In an example embodiment, initiating user computing entities 20 and/or a receiving user computing entities 25 are examples of user computing entities 30. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Node Computing Entity

Figure 2:
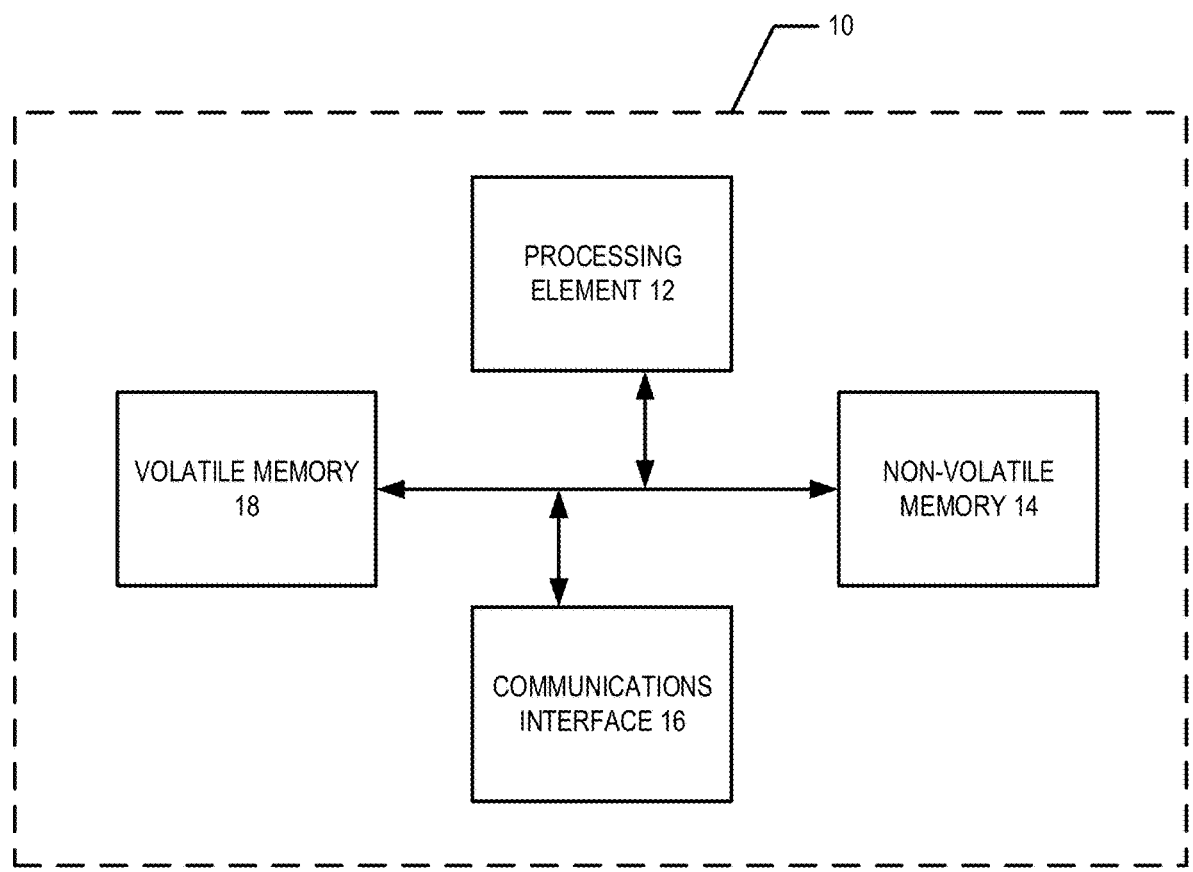
FIG. 2 is an exemplary schematic diagram of a node computing entity according to one embodiment of the present invention.

FIG. 2 provides a schematic of a node computing entity 10 according to one embodiment of the present invention. A node computing entity may be any computing entity that stores at least a portion of the distributed ledger (e.g., blockchain) data structure. For example, in an example embodiment, the CSS platform is provided via a distributed ledger (e.g., blockchain) data structure stored by a plurality of node computing entities 10. For example, the network of node computing entities 10 may store a CSS distributed ledger data structure configured to provide, support, and/or enable the CSS platform. For example, a node computing entity 10 may be a computing entity that connects to the CSS distributed ledger network storing the distributed ledger (e.g., blockchain) data structure. In an example embodiment, the two or more node computing entities 10 comprise at least one full node configured to fully enforce all validation and transaction rules of the distributed ledger (e.g., blockchain) data structure. For example, a full node may ensure that information/data of an event (e.g., transaction) is in the correct format for the corresponding event type (e.g., record type, transaction type), ensure that consensus rules of the distributed ledger (e.g., blockchain) are upheld, ensure that each event is signed with a valid signature, ensure that each event is provided by an entity having permission to provide the event, and/or the like.

In general, the terms computing entity, computer, entity, device, system, and/or similar words used herein interchangeably may refer to, for example, one or more computers, computing entities, desktops, mobile phones, tablets, phablets, notebooks, laptops, distributed systems, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the node computing entity 10 may also include one or more communications interfaces 16 for communicating with various computing entities, such as by communicating information/data, content, information, and/or similar terms used herein interchangeably that can be transmitted, received, operated on, processed, displayed, stored, and/or the like. For instance, the node computing entity 10 may communicate with initiating user computing entities 20, receiving user computing entities 25, and/or the like.

As shown in FIG. 2, in one embodiment, the node computing entity 10 may include or be in communication with one or more processing elements 12 (also referred to as processors, processing circuitry, processing device, and/or similar terms used herein interchangeably) that communicate with other elements within the node computing entity 10 via a bus, for example. As will be understood, the processing element 12 may be embodied in a number of different ways. For example, the processing element 12 may be embodied as one or more complex programmable logic devices (CPLDs), microprocessors, multi-core processors, coprocessing entities, application-specific instruction-set processors (ASIPs), microcontrollers, and/or controllers. Further, the processing element 12 may be embodied as one or more other processing devices or circuitry. The term circuitry may refer to an entirely hardware embodiment or a combination of hardware and computer program products. Thus, the processing element 12 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 12 may be configured for a particular use or configured to execute instructions stored in volatile or non-volatile media or otherwise accessible to the processing element 12. As such, whether configured by hardware or computer program products, or by a combination thereof, the processing element 12 may be capable of performing steps or operations according to embodiments of the present invention when configured accordingly.

In one embodiment, the node computing entity 10 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 14, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the node computing entity 10 may further include or be in communication with volatile media (also referred to as volatile storage, memory, memory storage, memory circuitry and/or similar terms used herein interchangeably). In one embodiment, the volatile storage or memory may also include one or more volatile storage or memory media 18, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 12. Thus, the databases, database instances, database management systems, information/data, applications, programs, program modules, scripts, source code, object code, byte code, compiled code, interpreted code, machine code, executable instructions, and/or the like may be used to control certain aspects of the operation of the node computing entity 10 with the assistance of the processing element 12 and operating system.

As indicated, in one embodiment, the node computing entity 10 may also include one or more communications interfaces 16 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the node computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the node computing entity 10 may include or be in communication with one or more input elements, such as a keyboard input, a mouse input, a touch screen/display input, motion input, movement input, audio input, pointing device input, joystick input, keypad input, and/or the like. The node computing entity 10 may also include or be in communication with one or more output elements (not shown), such as audio output, video output, screen/display output, motion output, movement output, and/or the like.

As will be appreciated, one or more of the node computing entity's 10 components may be located remotely from other node computing entity 10 components, such as in a distributed system. Furthermore, one or more of the components may be combined and additional components performing functions described herein may be included in the node computing entity 10. Thus, the node computing entity 10 can be adapted to accommodate a variety of needs and circumstances. As will be recognized, these architectures and descriptions are provided for exemplary purposes only and are not limiting to the various embodiments.

2. Exemplary User Computing Entity

Figure 3:
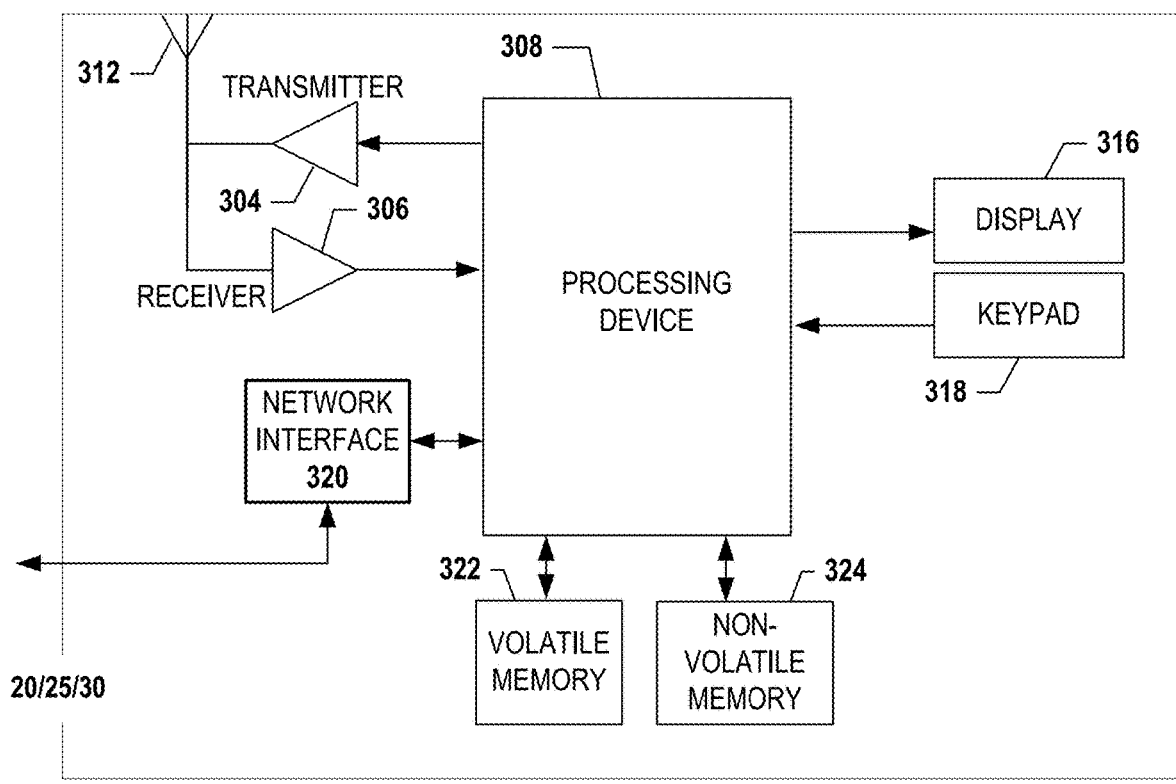
FIG. 3 is an exemplary schematic diagram of an initiating user computing entity according to one embodiment of the present invention.

FIG. 3 provides an illustrative schematic representative of a user computing entity 30 that can be used in conjunction with embodiments of the present invention. As noted above, initiating user computing entities 20 and receiving user computing entities 25 are examples of user computing entities 30. In an example embodiment, the initiating user computing entity 20 is operated by and/or on behalf of a user that is initiating an interparty transaction, such as a CSS claim, via the CSS platform. The initiating user may be the creditor or the debtor for the claim. In an example embodiment, the receiving user computing entity 25 is operated by and/or on behalf of a user that is an agent of a party of an interparty transaction (e.g., CSS claim) that was initiated and/or created via the CSS platform by an initiating user. The receiving user may be the creditor or the debtor for the interparty transaction. For example, an initiating user computing entity 20 may be a user computing entity 30 used to initiate a CSS claim via the CSS platform that identifies a user computing entity 30 that is a receiving user computing entity 25 to receive the CSS claim.

In one embodiment, a user computing entity 30 may include one or more components that are functionally similar to those of the node computing entity 10. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the user computing entity 30 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the node computing entity 10. In a particular embodiment, the user computing entity 30 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like. Similarly, the user computing entity 30 may operate in accordance with multiple wired communication standards and protocols, such as those described above with regard to the node computing entity 10 via a network interface 320.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include a location determining aspects, device, module, functionality, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using GPS). The satellites may be a variety of different satellites, including LEO satellite systems, DOD satellite systems, the European Union Galileo positioning systems, the Chinese Compass navigation systems, Indian Regional Navigational satellite systems, and/or the like. This data can be collected using a variety of coordinate systems, such as the DD; DMS; UTM; UPS coordinate systems; and/or the like. Alternatively, the location information can be determined/identified by triangulating the user computing entity's 30 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine/identify the location of someone or something to within inches or centimeters.

The user computing entity 30 may also comprise a user interface (that can include a display 316 coupled to a processing element 308) and/or a user input/interaction interface (coupled to a processing element 308). For example, the user interface may be configured to provide a user with an application, browser, interactive user interface (e.g., graphical user interface (GUI), command line interactive user interface, and/or the like), and/or similar words used herein interchangeably executing on and/or accessible via the user computing entity 30 to interact with and/or cause display of information from the node computing entity 10, as described herein. The user input/interaction interface can comprise any of a number of user input devices allowing the user computing entity 30 to receive information/data, such as a keypad 318 (hard or soft), a touch display, voice/speech/microphone or motion interfaces, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input/interaction interface can be used, for example, to activate or deactivate certain functions, such as screen savers and/or sleep modes.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the node computing entity 10 and/or various other computing entities.

In another embodiment, the user computing entity 30 may include one or more components or functionality that are the same or similar to those of the node computing entity 10, as described in greater detail above. As will be recognized, these architectures and descriptions are provided for exemplary purposes only and are not limiting to the various embodiments.

In an example embodiment, the user computing entity 30 may be a node of the CSS distributed ledger network. For example, the user computing entity 30 may connect to the CSS distributed ledger network. In an example embodiment, the user computing entity 30 is a lightweight node of the CSS distributed ledger network. A lightweight node is a computing entity that connects to the CSS distributed ledger network that does not enforce all of the validity and transaction rules. In example embodiments, the user computing entity 30 may have access to and/or may store a private key such that the user computing entity 30 may (a) provide and/or write events and/or (b) get and/or read events corresponding to one or more interparty transactions (e.g., CSS claims) stored, managed, negotiated, resolved, and/or the like via the distributed ledger (e.g., blockchain) data structure.

IV. EXEMPLARY SYSTEM OPERATION

As noted above, example embodiments provide methods, apparatuses, systems, and computer program products for providing a CSS platform configured for CSS claim creation, negotiation of created CSS claims between the named debtor and creditor parties, and resolution of CSS claims. In an example embodiment, the CSS platform is configured to facilitate and/or process payment of the creditor by the debtor of a resolved claim. In an example embodiment, the payment may be made using digital assets (e.g., cryptocurrencies). Moreover, the CSS platform secures sensitive information against access by third parties. For example, the CSS distributed ledger may use one or more key pairings so as to limit third party access to information/data stored and/or referenced therein.

In general, a distributed ledger (e.g., blockchain) data structure consists of two kinds of records: transactions and blocks. Blocks hold batches of transactions that are hashed and encoded into a data structure, such as a Merkle tree. Each block includes the hash of the prior block in the distributed ledger (e.g., blockchain) data structure, thereby linking the adjacent blocks. The linked blocks therefore form a chain. This iterative process confirms the integrity of the previous block, all the way back to the original genesis block. In example embodiments, a hash value, hash code, hash, and/or the like can be used to uniquely identify a string of text. For example, a hash may be a hex number, decimal number, or other number that encodes a text string. Various embodiments of the distributed ledger (e.g., blockchain) data structure may use various hash functions to generate a hash for a text string.

In example embodiments, the distributed ledger (e.g., blockchain) data structure comprises a plurality of ordered blocks as a distributed database to maintain data records secured from tampering and revision. Each block contains a timestamp, a link to a previous block, and/or other information/data. For example, in an exemplary embodiment, a block of the distributed ledger (e.g., blockchain) data structure may comprise a block header, a hash of the previous block's header, and/or a Merkle root. Each block stores event information/data for one or more events (e.g., transactions). The event information/data may include an event type (e.g., record type, transaction type), a unique interparty transaction identifier (e.g., claim identifier) for the CSS claim corresponding to the event, information/data corresponding to the event (which is event type (e.g., record type, transaction type) specific in an example embodiment), a created and/or initiated smart contract, a date and time corresponding to the event, a signature (e.g., an event may be signed using the providing entity's private key), and/or the like. In one embodiment, an event (e.g., transaction) may be one or more claims and/or one or more events associated with a claim. Thus, the terms are used herein interchangeably.

In an example embodiment, creation of the interparty transaction (e.g., CSS claim) via the CSS platform causes the creation of a smart contract within the CSS distributed ledger and a unique claim identifier configured to identify the interparty contract (e.g., CSS claim) within the CSS platform. For example, a smart contract may be created and stored within a block of the CSS distributed ledger. The initiator/creator of the CSS claim and the receiver and/or other named party therein may negotiate the CSS claim. The negotiation of the CSS claim may cause amendments and/or changes to be made to the created smart contract. The various versions and/or updates/modifications to the smart contract may be stored in the CSS distributed ledger via blocks that are linked back (e.g., via a hash, Merkle root, transaction/claim identifier, and/or the like) to the previously stored blocks corresponding to the CSS claim and/or corresponding smart contract. Once the parties of the CSS claim agree to a claim as a whole and/or by each line item, the final smart contract may be stored within the CSS distributed ledger and initiated. For example, an initiated smart contract may be executed, for example by one or more processing elements 12 of one or more node computing entities 10, such that partially or fully self-executing and/or self-enforcing clauses of the smart contract will self-execute and/or self-enforce. Information/data corresponding to the self-execution and/or self-enforcement of the smart contract may be stored within the CSS distributed ledger such that the information/data corresponding to the self-execution and/or self-enforcement is stored in one or more blocks linked to the block storing the initiated smart contract and/or the initial block of the corresponding claim. For example, in an example embodiment, the smart contract may be self-executing such that currency owed to the creditor by the debtor of the resolved claim may be automatically debited from an account corresponding to the debtor and credited to an account corresponding to the creditor. In an example embodiment, the currency exchanged is a digital asset (e.g., cryptocurrency).

Figure 4:
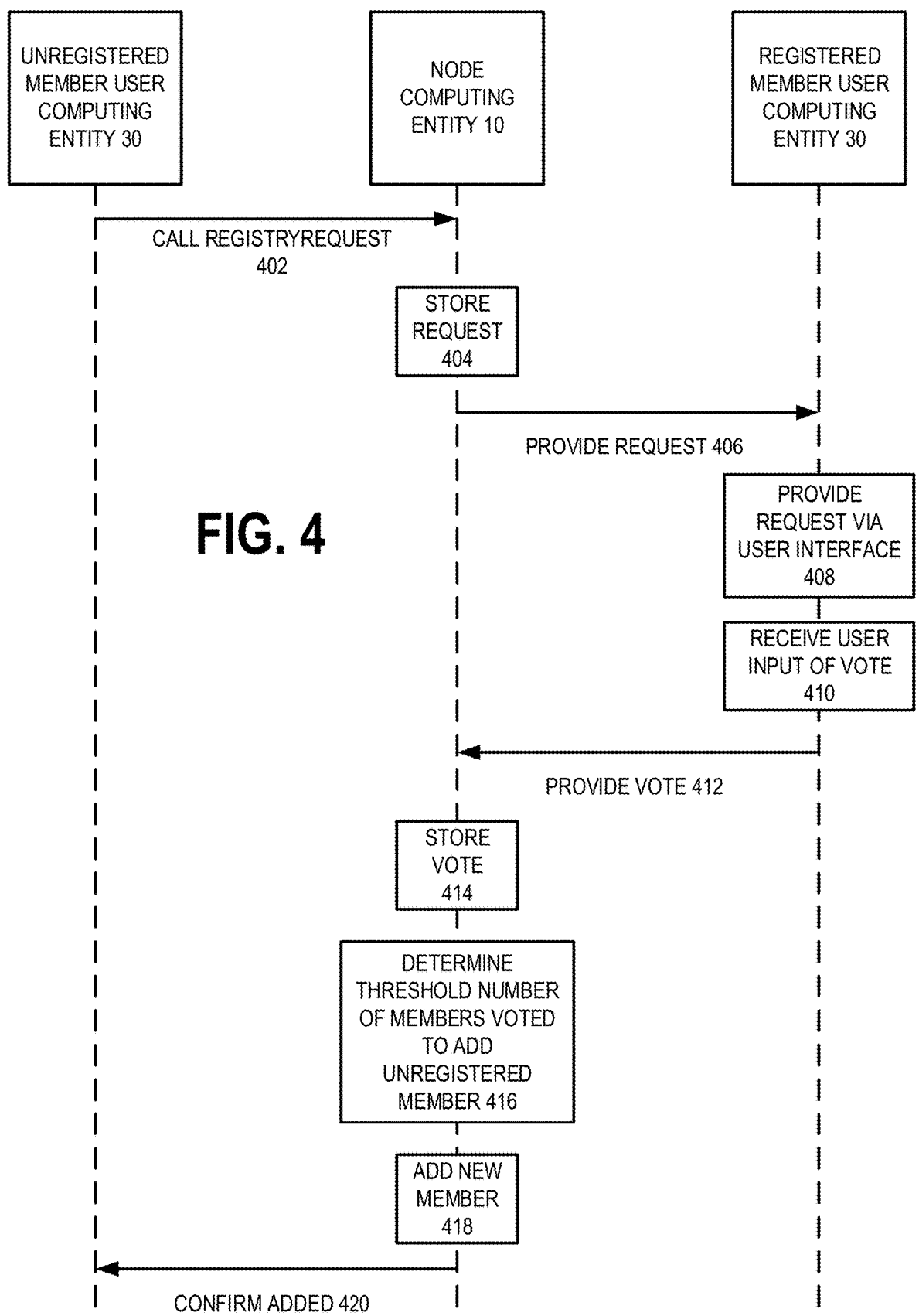
FIG. 4 is flowchart illustrating example steps, operations, processes, and/or procedures for adding a new member to the claim subrogation and salvage (CSS) blockchain network.

In an example embodiment, after the smart contract has been initiated for resolution of a CSS claim, either of the parties of the CSS claim (the original initiator or the original receiver) may initiate a supplement claim. The supplement claim may further modify, update, change, amend, and/or the like the initiated smart contract of the original claim and/or cause the creation of a new smart contract. In an example embodiment, a supplement claim may be linked to the original claim within the distributed ledger (e.g., blockchain) (e.g., via a reference thereto, claim identifier, and/or the like). The security of the information/data corresponding to the CSS claims is secured through the use of private keys that only allow users having permission (e.g., access to the appropriate private key) to access the information/data corresponding to a CSS Exemplary CSS Distributed Ledger Network Member Management Tasks FIG. 4 provides a flowchart illustrating example steps, operations, processes, and/or procedures for adding a new member to a CSS distributed ledger network. Starting at step/operation 402, a user computing entity 30 operated by and/or on behalf of an unregistered member (referred to herein as the unregistered member user computing entity 30) calls a registry request operation, function, and/or the like of the CSS platform. For example, the unregistered member user computing entity 30 may, in response to receiving user input, provide a request asking to be added to the CSS distributed ledger network. In an example embodiment, the registry request call comprises a name identifying the unregistered member. For example, the name may be an organization name, company name, company division name, and/or the like.

The node computing entity 10 receives the registry request call and stores the request at step/operation 404. For example, the CSS platform operating on the node computing entity 10 (e.g., via execution of application program code corresponding to the CSS platform by the processing element 12), may receive the registry request call. In an example embodiment, the request may be stored to the CSS distributed ledger or another data store. For example, the request may be stored to a data store (e.g., database) storing membership information/data for one or more members of the CSS distributed ledger network. At step/operation 406, the node computing entity 10 provides an indication of the request to a plurality of registered member computing entities 30 (e.g., user computing entities 30 operated by and/or on behalf of registered members of the CSS distributed ledger network). For example, a registered member computing entity 30 may provide the request to a user via an interactive user interface displayed via the display 316, at step/operation 408. At step/operation 410, a registered member computing entity 30 receives user input (e.g., via a user input device) indicating a "yes" vote, a "no" vote, or an "abstain" in response to the request from the unregistered user. At step/operation 412, the registered member user computing entity 30 provides the vote (e.g., yes, no, abstain), to the node computing entity 10. The node computing entity 10 receives the vote and stores the vote (e.g., in the CSS distributed ledger or other data store) at step/operation 414. At step/operation 416, the node computing entity 10 determines if at least a threshold number of registered user computing entities 30 have provided "yes" votes.

Responsive to determining that at least a threshold number of registered user computing entities 30 have provided "yes" votes, the CSS platform operating on the node computing entity 10 adds the unregistered member as a new member of the CSS distributed ledger network at step/operation 418. For example, the CSS platform operating on the node computing entity 10 may generate a member identifier, user/member/party profile, user token, and/or the like for the new member, such that the new member is now a registered member of the CSS distributed ledger network. In an example embodiment, at step/operation 420, the node computing entity 10 provides a response to the unregistered member user computing entity 30 indicating/confirming that the unregistered member is now a new member of the CSS distributed ledger network.

Exemplary Digital Asset Management

After a new member has been added to the CSS distributed ledger network, the new member may request (e.g., via a corresponding user computing entity 30) to initialize a value store for the new member. For example, the user computing entity 30 operated by and/or on behalf of the new member may provide a currency request call. For example, the currency request call may comprise a plurality of parameters comprising one or more of a member identifier, an initial supply of the digital asset (e.g., a number, amount, and/or value), a description of the digital asset (e.g., cryptocurrency), the number of decimal units to be used to describe the digital asset (e.g., two decimal points), coin symbol, and/or the like. Responsive to receiving and processing the currency request call, the node computing entity 10 (e.g., the CSS platform executing on the node computing entity 10) creates and stores a new token and/or value store based on the parameters of the currency request call.

In various embodiments, a token is a smart contract comprising a mapping of account addresses for one or more accounts associated with a party owning the token (e.g., the party the token was generated for) and addresses of the balances of the token and/or the accounts referenced in the token. In an example embodiment, tokens are sued to keep track of debts of a party until the settlement phase settles a claim and the debt is paid. For example, a token may be exchanged as a promise of payment from the party issuing the token. When a debt has been settled/paid, the corresponding token may be destroyed, in an example embodiment. Each party has a token created when the party becomes a member of the CSS distributed ledger network, as described above, for example, and may generate additional tokens as necessary, as described below. In an example embodiment, the tokens may be in a standardized format such as, for example, ERC-20 format in an Etherium-based example embodiment.

In various embodiments, a member of the CSS distributed ledger network may provide a request to mint new digital assets (e.g., cryptocurrencies). For example, a user may operate a user computing entity 30 to provide a mint request. In an example embodiment, the mint request may comprise one or more parameters such as a member identifier, a number and/or amount/value of digital assets (e.g., cryptocurrencies) to mint, and/or the like. The CSS platform operating on the node computing entity 10 may receive the mint request and call a minting operation on the stored token and/or value store corresponding to the member identifier. In an example embodiment, the call to the minting operation includes the number and/or amount/value parameter of the mint request.

In various embodiments, a member of the CSS distributed ledger network may provide a request to destroy digital assets (e.g., cryptocurrencies) owned by the member. For example, a user may operate a user computing entity 30 to provide a destroy request. In an example embodiment, the destroy request may comprise one or more parameters such as a member identifier, a number and/or amount/value of digital assets (e.g., cryptocurrencies) to destroy, and/or the like. The CSS platform operating on the node computing entity 10 may receive the destroy request and call a destroying operation on the stored token and/or value store corresponding to the member identifier. In an example embodiment, the call to the minting operation includes the number and/or amount/value parameter of the destroy request.

In various embodiments, a member of the CSS distributed ledger network may provide a request to check a balance of digital assets (e.g., cryptocurrencies) corresponding to and/or owned by the member. For example, a user may operate a user computing entity 30 to provide a balance check request. In an example embodiment, the balance check request may comprise one or more parameters such as a member identifier, the address of the carrier (e.g., value store, token, and/or the like) to inspect, and/or the like. The CSS platform operating on the node computing entity 10 may receive the balance check request and call a balance check operation on the stored token and/or value store corresponding to the member identifier based on the provided address of the carrier. For example, the CSS platform operating on the node computing entity 10 may check the balance of the token stored at and/or in association with the provided address. The node computing entity 10 may then return the determined balance to the user computing entity 30 such that the user computing entity 30 may provide the determined balance to a user (e.g., via a display 316).

In various embodiments, a request may be signed and/or encrypted using an encryption key particular to the member. In such embodiments, a request may not need to include a member identifier as the signing and/or encryption of the request may act to identify the providing member.

Exemplary CSS Claim Processing

Figure 5:
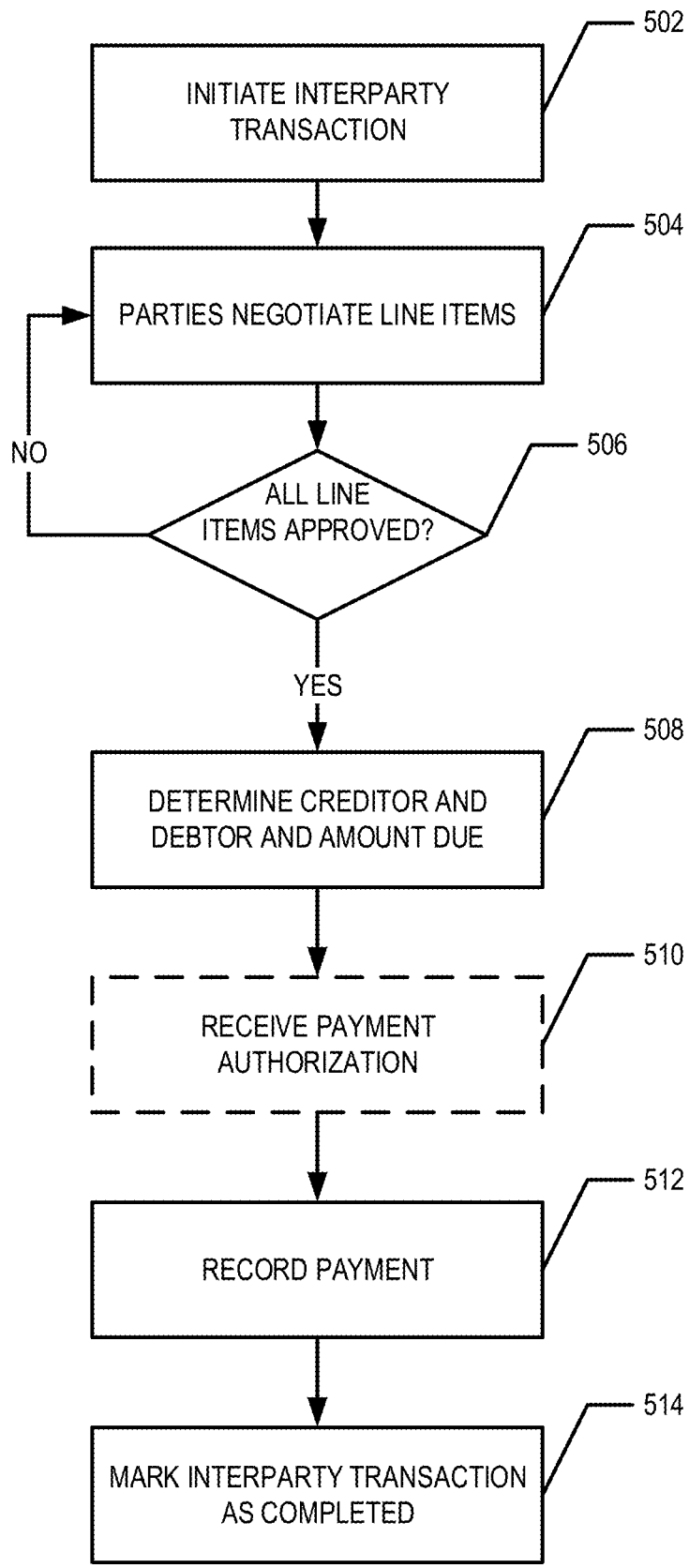
FIG. 5 is a flowchart illustrating example steps, operations, processes, and/or procedures for performing CSS processing and corresponding distributed ledger (e.g., blockchain) data structure according to one embodiment of the present invention.
Figure 6:
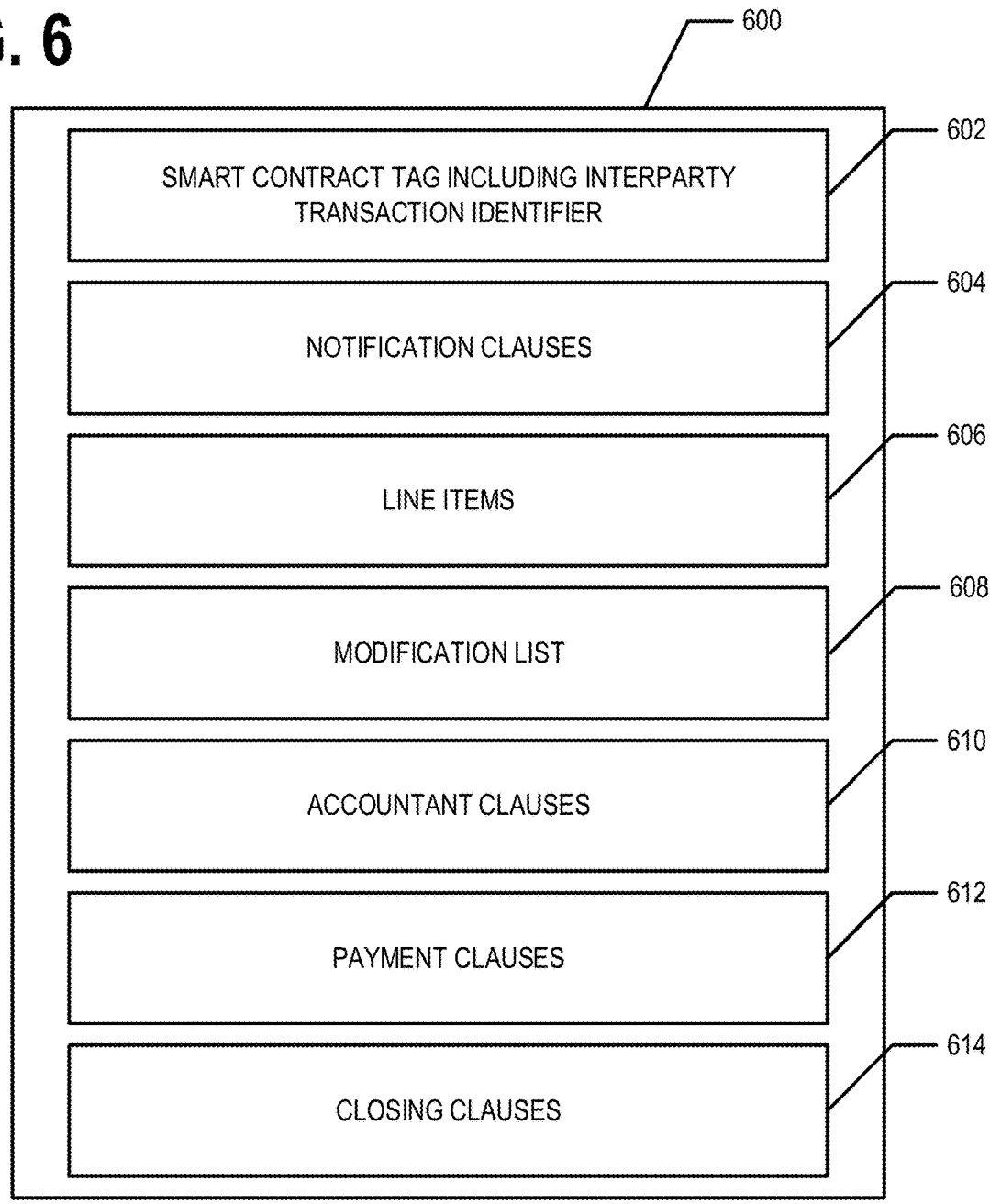
FIG. 6 is a schematic diagram of an example smart contract that may be used by the claim subrogation and salvage claim processing according to one embodiment of the present invention.

FIG. 5 provides a flowchart illustrating example steps, operations, processes, and/or procedures for performing CSS claim processing according to one embodiment of the present invention. In an example embodiment, the steps, operations, processes, and/or procedures illustrated in FIG. 5 may be completed by one or more processing elements 12 of one or more node computing entities 10. For example, a node computing entity 10 may make updates to the CSS distributed ledger data structure (e.g., add new blocks thereto) which may then be propagated to various other node computing entities 10. In various embodiments, a user operating an initiating user computing entity 20 may access an interactive user interface of the CSS platform (e.g., via an application operating on the initiating user computing entity 20, a web browser, Internet-based portal, and/or the like) to submit information/data corresponding to a CSS claim. The submission of the CSS claim via the initiating user computing entity 20 triggers the generation of a smart contract (e.g., by a node computing entity 10 or the initiating user computing entity 20) and the execution of the smart contract to provide negotiation and settlement of the CSS claim. FIG. 6 illustrates an example of a smart contract that may be generated in response to the submission of the CSS claim via the user interaction with a claim submission interface.

Starting at step/operation 502 of FIG. 5, an interparty transaction is created, initiated, and/or the like. In an example embodiment, the interparty transaction is a CSS claim. For example, a node computing entity 10 may receive an interparty transaction request (e.g., a CSS claim creation request). For example, a user operating an initiating user computing entity 20 may provide and/or select information/data corresponding to a CSS claim to be created. The initiating user computing entity 20 may then generate a CSS claim creation request based on and/or comprising at least a portion of the user-provided and/or user-selected information/data corresponding to a CSS claim to be created. The initiating user computing entity 20 may then provide the CSS claim creation request to one or more node computing entities 10 of the CSS distributed ledger network. A node computing entity 10 may then receive the CSS claim creation request.

Figure 7:
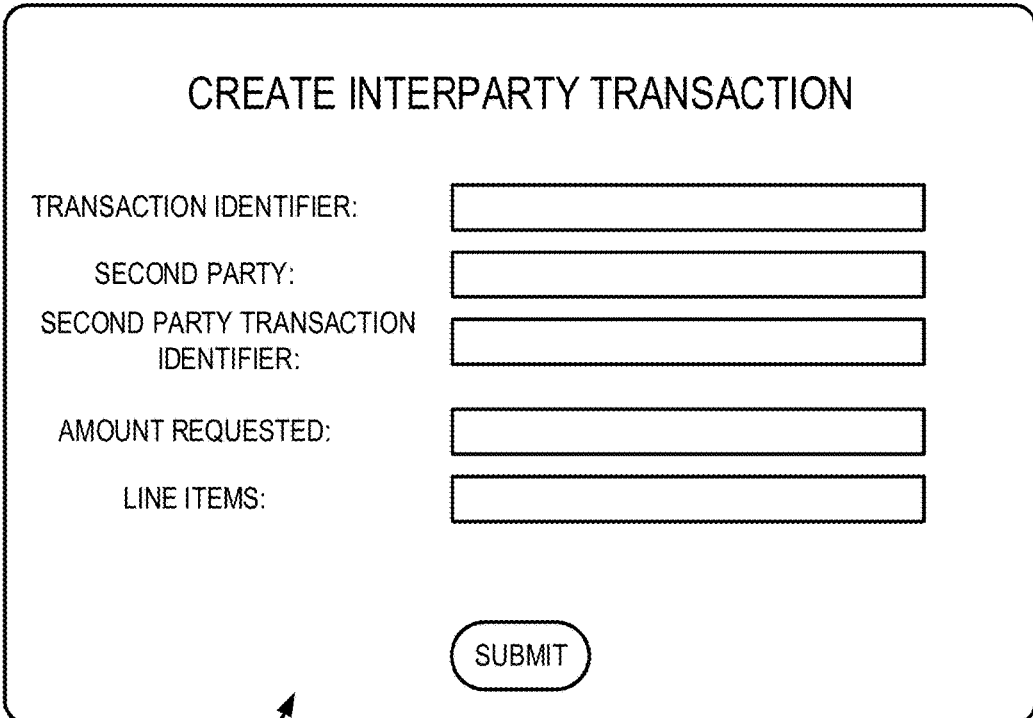
FIG. 7 illustrates an example interparty transaction creation interface according to one embodiment of the present invention.

FIG. 7 illustrates an example claim creation interface 700 that may be provided to a user of an initiating user computing entity 20 (e.g., via display 316). For example, the user may be provided with one or more data fields from which the user may enter claim information/data, select selectable options to select claim information/data, and/or the like. For example, the user may enter and/or select a transaction identifier (e.g., a first party claim identifier) identifying the CSS claim according to a first entity system corresponding to the user, a second party (e.g., associated with the receiving user computing entity 25), a second party transaction identifier (e.g., a second party claim identifier) identifying the CSS claim according to a second entity system corresponding to the second party, an amount of the claim, one or more line items for the claim, and/or the like. In an example embodiment, the second party transaction identifier (e.g., second party claim identifier) may be provided by a user associated with the second party. In an example embodiment, the user may be able to upload, attach, and/or the like a document (e.g., an excel worksheet, formatted data file, and/or the like) comprising one or more line items of the CSS claim. In an example embodiment, each line item may include a value, a line item type code, a receiver and/or provider, and/or other line item information/data. In an example embodiment, the amount of the CSS claim may be determined by summing the value of the one or more line items. After the user has entered and/or selected the claim information/data, the user may select the submission element of the claim creation interface. Responsive to receiving user input selecting the submission element, the initiating user computing entity 20 may automatically generate a smart contract for the CSS claim based on the claim information/data or may provide (e.g., transmit) the claim information/data to a node computing entity 10 so that the node computing entity 10 may automatically generate the smart contract for the CSS claim.

In an example embodiment, the initiating user computing entity 20 may generate and/or create a smart contract and include the smart contract in the CSS claim creation request or cause the generation of the smart contract by the node computing entity 10. The node computing entity 10 may then add a block corresponding to the new created CSS claim and/or the corresponding smart contract to a new block of the CSS distributed ledger. In another example embodiment, the node computing entity 10 may generate the smart contract corresponding CSS claim and generate the CSS claim based on the CSS claim creation request. An indication of the generation and/or initiation of the smart contract and/or CSS claim may be stored to a block of the CSS distributed ledger. For example, the smart contract and/or CSS claim may be stored to a block of the CSS distributed ledger. In an example embodiment, storing of a CSS claim and/or corresponding smart contract may cause an alert, notification, and/or message to be provided (e.g., transmitted) to the receiving user computing entity 25 to notify the receiving user of the generated CSS claim. For example, in one embodiment, a smart contract corresponding to a CSS claim may be generated and at least a portion thereof may be initiated when the smart contract is stored to the CSS distributed ledger. For example, the smart contract may contain a clause causing the alert, notification, message, and/or the like to be provided to the receiving user computing entity. For example, the information/data corresponding to the CSS claim may identify one or more receiving users and/or digital addresses associated therewith. The alert, notification, and/or message may then be provided to the receiving users based on the provided digital addresses and/or digital addresses that are identified from one or more blocks of the CSS distributed ledger (e.g., comprising user/member/party profile information/data for the corresponding receiving user/member/party). In an example embodiment, the smart contract may further contain a clause that provides a time frame under which the receiving user computing entity 25 has to provide an initial response to the generated claim or otherwise it will be assumed that the receiving user agrees with the CSS claim and the smart contract will automatically initiate the resolution of the claim (e.g., payment of the creditor by the debtor).

In an example embodiment, the node computing entity 10 generates the smart contract for the CSS claim. In an example embodiment, the CSS platform 800 comprises a platform main program 805, as shown in FIG. 8. The platform main program 805 is an orchestrator smart contract deployed to the CSS distributed ledger, in an example embodiment. In an example embodiment, the platform main program 805 comprises claim smart contract code (e.g., settlement program 815) that is compiled at the time the platform main program 805 is compiled. The claim smart contract code may be in the form of bytecode. For example, the claim smart contract code may be provided as a library accessible and/or incorporated into the platform main program 805. In another example, the claim smart contract code may be provided as a sub-class and/or a smaller class of code within the platform main program 805. Each element of the claim smart contract code may be associated with one or more flags, meta-data, input parameters, and/or the like for matching elements of claim smart contract code with the information/data of a CSS claim creation request. A claim generation function of the platform main program 805 is called responsive to receipt of the CSS claim creation request by the node computing entity 10. The claim generation function references various elements of the claim smart contract code based on the information/data provided in the CSS claim creation request. For example, the CSS claim creation request may comprise one or more flags and/or information/data that may trigger one or more flags that may then be used to identify various elements of the claim smart contract code to be used in generating a smart contract corresponding to the CSS claim. For example, the smart contract may be built from various elements of the claim smart contract code (e.g., that is already compiled in the platform main program 805) based on the information/data (e.g., including metadata, flags, etc.) provided in the CSS claim creation request via the performance of the claim generation function of the of the platform main program 805. The newly generated claim smart contract representing the CSS claim may then be stored (e.g., in memory 14, 18) and an address for the newly generated claim smart contract may be returned such that the claim smart contract may be referenced and/or accessed in performance of future functions corresponding to the CSS claim.

Thus, in an example embodiment, the elements of smart contract code used to build the smart contracts tailored to each of the various CSS claims exists in a compiled form in the platform main program 805 prior to the receipt of the CSS claim creation request and particular elements are selected (e.g., based on the CSS claim creation request) to be included in the smart contract representing the particular CSS claim. For example, the smart contract code may be deployed as part of the platform main program 805. This allows for the efficient generation of specialized smart contracts for each CSS claim without the need for a programmer to prepare a tailored smart contract for each CSS claim while preventing any possible compilation errors from occurring during the generation of the smart contract representing a particular CSS claim. Moreover, no interface (e.g., application programming interface (API), application binary interface (ABI), and/or the like) is needed between the platform main program 805 and the smart contract code used to build a smart contract representing a particular CSS claim. In various embodiments, the platform main program 805 may further comprise smart contract elements that may be used to build settlement smart contracts 815, transaction payment smart contracts 820, token smart contracts corresponding to the tokens 810 described elsewhere herein, and/or the like (see FIG. 8). Thus, the platform main program 805 comprises functions configured to efficiently and automatically generate multiple types of smart contracts using the pre-compiled smart contract elements to custom build appropriate smart contracts for each interparty transaction, party, and/or the like while avoiding possible compilation issues and the time and processing power necessary for compiling a smart contract.

In another example embodiment, the platform main program 805 comprises a claim smart contract (e.g., settlement program 815) comprising elements of smart contract code. For example, as described above, the claim smart contract may comprise bytecode and/or another form of code for use in representing a CSS claim as a smart contract. In an example embodiment, the claim smart contract may be provided as a library and/or as a sub-class or smaller class of the platform main program 805. The claim generation function receives a plurality of input parameters from the CSS claim creation request and creates a tailored copy of the claim smart contract using the input parameters. For example, the CSS claim creation request may comprise one or more fields defining the values (e.g., numerical value, string value, and/or the like) of one or more parameters. The values of at least some of the one or more parameters may be provided as input parameters to the claim generation function. For example, the claim generation function may fill in parameters of the claim smart contract based on the input parameters that were pulled and/or read from the CSS claim creation request. For example, the CSS claim creation request may comprise a field defining a value of a first party parameter (e.g., a string comprising the first party name, a party identifier (e.g., a member id number that may be used to look up/access/identify a member profile), an address where a party profile is stored that corresponds to the first party, and/or the like). The claim generation function may receive the value of the first party parameter and use that value to fill in a value for a first party parameter at one or more instances within the claim smart contract. For example, the claim smart contract may comprise an element of smart contract code that is configured to receive a value for a first party parameter such that the first party of the CSS claim is identified and the claim generation function may fill in the value of the first party parameter for that element of smart contract code using the value of the first party parameter read from the CSS claim creation request. Values for various other parameters that may be harvested and/or read from the CSS claim creation request and provided as input to the claim generation function including, for example, one or more of the first party of the claim, the second party of the claim, at least one line item of the claim, a first party claim identifier, a second party claim identifier, and/or the like. Values for various other parameters may also be filled in within the elements of smart contract code by the claim generation function based on values of parameters read from the CSS claim creation request such that some elements of the smart contract code may be "turned off" or "turned on" and/or one or more flags may be set for the instance of the smart contract representing the CSS claim based on the information/data provided in the CSS claim creation request. The newly generated claim smart contract representing the CSS claim may then be stored (e.g., in memory 14, 18) and an address for the newly generated claim smart contract may be returned such that the claim smart contract may be referenced and/or accessed in performance of future functions (e.g., negotiation, settlement, payment, and/or the like) corresponding to the CSS claim. Such an embodiment may also provide the advantage of efficient, automated, and tailored smart contract generation for representing a CSS claim (and/or other transaction) while avoiding possible compilation issues and the time and processing power necessary for compiling a smart contract or needing to provide an interface (e.g., application programming interface (API), application binary interface (ABI), and/or the like) for the platform main program 805 to use in accessing the the smart contract code used to build a smart contract representing a particular CSS claim.

In an example embodiment, a transaction identifier (e.g., claim identifier) is generated when a new CSS claim is generated. The transaction identifier (e.g., claim identifier) may be used within the CSS platform to identify the CSS claim. For example, each block and/or block portion comprising information/data corresponding to the CSS claim may be indexed by the corresponding transaction identifier (e.g., claim identifier). For example, the smart contract representing the CSS claim in the CSS platform may be associated with meta-data comprising the transaction identifier (e.g., claim identifier) corresponding to the CSS claim.

Returning to FIG. 5, at step/operation 504, the parties may negotiate the CSS claim and/or the individual line items of the CSS claim. For example, the receiving user computing entity 25 may receive an alert, notification, and/or message regarding the generated CSS claim. The receiving user computing entity 25 may provide the alert, notification, message, and/or an indication thereof to a receiving user via a display device, audio device, and/or the like of the receiving user computing entity 25. The receiving user may access a user interface (via the receiving user computing entity 25) associated with the CSS distributed ledger to view the CSS claim; corresponding smart contract and/or representation thereof (e.g., rather than the raw computer executable code itself); previous updates, modifications, changes, and/or the like to the claim and/or corresponding smart contract, and/or the like. The receiving user (e.g., operating the receiving user computing entity 25) may review one or more line items of the CSS claim and approve, reject, and/or modify each of the one or more line items via the user interface. The receiving user may further add one or more line items to the CSS claim via the user interface. The receiving user computing entity 25 may then generate a CSS claim update request comprising, encoding, and/or the like the CSS claim line item approvals, rejections, modifications, and/or additions provided by the receiving user via the user interface. The receiving user computing entity 25 may then provide the CSS claim update request.

The node computing entity 10 receives the CSS claim update request. In one example embodiment, a node computing entity 10 receives the CSS claim update request and generates an updated smart contract based there on. The CSS claim update request may comprise an updated smart contract in one example embodiment. The updated smart contract and/or other information/data provided in the CSS claim update request may be stored to the CSS distributed ledger. In an example embodiment, the updated smart contract and/or other information/data provided in the CSS claim update request may be stored to the CSS distributed ledger such that corresponding block and/or block portion is indexed by the corresponding transaction identifier (e.g., claim identifier). For example, the claim update request may comprise the address of the corresponding claim smart contract and the values and/or identities of one or more parameters to be updated. An update function of the platform main program 805 may be called and provided the address of the corresponding claim smart contract and the values and/or identifies of the one or more parameters to be updated. The update function may then generate a new claim smart contract and/or record updates to the corresponding claim smart contract (identified by the provided address) such that the parameters of the claim smart contract may be updated based on the negotiations of the parties of the CSS claim. In an example embodiment, one or more line items may be updated (e.g., a description, value, and/or the like of the line item may be updated), a first or second party approval flag and/or parameter for a line item may be updated, and/or the like based on the claim update request. The address of the new and/or updated claim smart contract may be returned and used for accessing the new/updated smart contract representing the CSS claim during the continued negotiation of the CSS claim and/or settlement of the CSS claim.

At step/operation 506, it is determined if the CSS claim as a whole and/or if all of the line items of the CSS claim are approved by all of the parties party to that line item of the CSS claim. For example, the node computing entity 10 may determine if the CSS claim as a whole and/or if all of the line items of the CSS claim have been approved by the initiating user and the receiving user(s). If the CSS claim as a whole and/or all of the line items have been approved by the initiating user and the receiving user(s), the process continues to step/operation 508. If it is determined that the CSS claim as whole has not been approved and/or that at least one line item has not been approved by the initiating user and the receiving user(s), the process returns to step/operation 504 and the party that has not yet approved the CSS claim and/or one or more line items is notified.

At step/operation 508, the creditor and the debtor and the amount owed to the creditor by the debtor are determined. For example, the smart contract and/or one or more clauses thereof may be initiated and executed by one or more processing elements 12 of one or more node computing entities 10. In particular, one or more accountant clauses may be initiated. Execution of the one or more accountant clauses of the smart contract may cause each line item (and/or one or more line items) of the CSS claim to be considered in a determination of the amount owed to each party of the CSS claim by each other party of the CSS claim. For example, if a Party A and Party B are the parties of a CSS claim, line item 1 may indicate that Party A owes Party B $500 and line item 2 may indicate that Party B owes Party A $300. Thus, execution of the accountant clauses will determine that, based on line item 1 and line item 2, that Party B is the creditor and Party A is the debtor. Moreover, execution of the accountant clauses will determine that, based on line item 1 and line item 2, Party A owes Party B $200, in an example embodiment. After and/or responsive to determination of the debtor, the token corresponding to the debtor's digital assets (e.g., cryptocurrencies) may be accessed, in an example embodiment, to ensure the token corresponding to the debtor's digital assets (e.g., cryptocurrencies) is associated with sufficient value. In an example embodiment, after and/or responsive to determination of the creditor, the token corresponding to the creditor's digital assets (e.g., cryptocurrencies) may be accessed, to ensure the token corresponding to the creditor's digital assets (e.g., cryptocurrencies) is a valid token. In an example embodiment, the token corresponding to the debtor's digital assets (e.g., cryptocurrencies) and the token corresponding to the creditor's digital assets (e.g., cryptocurrencies) may be assessed to facilitate the exchange of value from the debtor's token to the creditor's token. In an example embodiment, the debtor may issue a token (e.g., cause a token smart contract to be generated) and provide the issued token as a promise of payment of the debt. The payment of the debt may occur during a settlement phase of the CSS claim.

At step/operation 510, payment authorization is optionally received. For example, in response to the determination of the creditor and the debtor and the amount owed, an alert, notification, and/or message may be provided to the initiating user computing entity 20 and/or the receiving user computing entity 25. The initiating user computing entity 20 and/or the receiving user computing entity 25 may receive user input authorizing payment and may provide the payment authorization. The node computing entity 10 may then receive the payment authorization and append the payment authorization to the CSS distributed ledger.

At step/operation 512, the payment is recorded. For example, the payment and/or an indication thereof may be recorded to the CSS distributed ledger by, for example, a node computing entity 10. In an example embodiment, the payment is made by execution (e.g., by a processing element 12 of a node computing entity 10) of one or more payment clauses within the smart contract corresponding to the CSS claim. For example, the platform main program 805 may call a payment creation function and pass the address of the most recent version of the corresponding claim smart contract to the payment creation function. The payment creation function may generate a new payment smart contract (e.g., from and/or based on the transaction payment smart contract 820) in a manner similar to that described above for generating a claim smart contract. The payment smart contract may receive the address of the tokens issued corresponding to the CSS claim, the address of the claim smart contract, and/or the like and the payment smart contract may cause the payment of the creditor by the debtor, and/or the like. In an example embodiment, the payment is processed, made, and/or the like through the exchange of digital assets (e.g., cryptocurrencies) within the CSS distributed ledger. For example, the account corresponding to the debtor on the CSS distributed ledger may be debited the owed amount and the account corresponding to the creditor on the CSS distributed ledger may be credited the owed amount. In another example, the payment may be made through traditional payment methods (e.g., check, ACH payment processing, and/or the like) and an indication thereof may be recorded in the CSS distributed ledger. In an example embodiment, the execution of the payment clauses of the smart contract may cause the automatic payment of the creditor by the debtor an amount that is determined based on the amount owed (e.g., the amount owed, the amount owed minus a processing fee and/or the like) via whatever payment means are indicated in the payment clause of the smart contract. For example, the execution of the payment clause(s) of the smart contract may cause the initiation of an ACH payment, a digital asset (e.g., cryptocurrency) payment within the distributed ledger (e.g., blockchain) data structure, and/or the like.

At step/operation 514, the CSS claim is marked as closed. For example, upon the completion of execution of the smart contract corresponding to the CSS claim, it may be recorded within the CSS distributed ledger data structure that the CSS claim has been completed and/or closed. For example, the smart contract may comprise a closing cause that is executed upon the completion of execution of the other clauses of the smart contract. Execution of the closing clause may cause the CSS distributed ledger to record that the CSS claim (as indexed by the transaction/claim identifier) has been completed and/or closed. When a CSS claim is closed and/or marked as completed, no further automatic action is taken corresponding to the claim. For example, the smart contract corresponding to the CSS clause is no longer executed as all of the clauses have been executed in full.

In an example embodiment, the initiating user or the receiving user of a CSS claim may, after the completion and/or closing of the CSS claim, submit a supplement claim request to open a supplement claim corresponding to the original CSS. For example, a supplement claim request may be similar to a CSS claim creation request but may reference a transaction identifier (e.g., claim identifier) corresponding to a closed and/or completed CSS claim. The supplement claim request may be processed in a manner similar to an original CSS claim, as outlined above.

FIG. 6 is a schematic diagram of a smart contract 600 used by the CSS platform in an example embodiment. In an example embodiment, the smart contract 600 may comprise a tag 602, one or more notification clauses 604, line item details 606, a modification list 608, one or more accountant clauses 610, one or more payment clauses 612, and one or more closing clauses 614. Each portion of the smart contract may comprise one or more portions of computer executable code, metadata, comments, and/or the like. The tag 602 may comprise information/data identifying the CSS claim (e.g., the corresponding claim identifier) and other information/data and/or metadata corresponding to the CSS claim. The notification clauses 602 may provide information/data regarding notifying the receiving user (e.g., providing an alert, notification, and/or message, the digital address to send the alert, notification, and/or message to, and/or the like) to the receiving user computing entity 25 (and/or the initiating user computing entity 20), a timeframe during which the receiving user may respond to the CSS claim and/or for the initiating/receiving user to respond to changes made by the other party, stipulations regarding what happens if the initiating/receiving user does not respond within the time frame, and/or the like. The line item details 606 may include various claim information/data corresponding to line items of the CSS claim. The modification list 608 may store information/data corresponding to updates made to the CSS claim and/or smart contract based on input received from an initiating/receiving user (e.g., via an initiating/receiving user computing entity 20/25) and/or based on execution of one or more clauses of the smart contract. The accountant clauses may be configured to determine which party is the creditor corresponding to the CSS claim, which party is the debtor corresponding to the CSS claim, the amount owed to the creditor by the debtor, and/or the like based on, for example, the line item details 606. The payment clauses 612 may be configured to cause initiation, processing, and/or the like of payment of the creditor by the debtor based on the amount owed. The closing clauses 614 may be configured to mark a smart contract and/or corresponding CSS claim as complete and/or closed upon the resolution of smart contract (e.g., when all of the other clauses of the smart contract have been fully executed).

For example, an initiating user computing entity 20 and/or a node computing entity 10 may generate a smart contract 600 and store the smart contract within a block of the CSS distributed ledger. One or more clauses of the smart contract 600 may then be executed (e.g., the notification clauses 604) by, for example, a node computing entity 10. The receiving user computing entity 25, initiating user computing entity 20, and/or node computing entity 10 may generate one or more updated versions of the smart contract 600 and the updates and/or modifications may be added to the modification list 608. Once the CSS claim as a whole and/or each of the line items is approved by the parties of the CSS claim, the accountant clauses 610 may be executed (e.g., by a node computing entity 10) to determine the debtor and creditor and the amount owed to the creditor by the debtor for resolution of the CSS claim. The payment clauses 612 may then be executed (e.g., by a node computing entity 10) to initiate, facilitate, processes, and/or cause the payment of the creditor by the debtor and the recording of the payment within the CSS distributed ledger. Once all of the other clauses of the smart contract have been fully executed, the closing clauses 614 may be executed to cause the CSS claim to be marked as complete and/or closed. As should be understood, even though various embodiments are described herein as using a distributed ledger (e.g., blockchain) data structure, various other distributed ledger data structures may be used without departing from the scope and spirit of the present invention.

Platform Software Architecture

FIG. 8 illustrates an example software architecture of an example embodiment of the CSS platform 800. For example, the CSS platform 800 may comprise a platform main program 805, one or more tokens 810, a settlement program 815, and a transaction payment program 820. For example, each of the platform main program 805, one or more tokens 810, a settlement program 815, and a transaction payment program 820 may comprise computer-executable program code, that when executed by a processor (e.g., processing element 12) cause various functions of the CSS platform 800 to be performed. In an example embodiment, the platform main program 805 is deployed as a smart contract on the CSS distributed ledger and includes the token 810, settlement program 815, and transaction payment program 820 smart contracts as libraries, sub-classes, classes, and/or the like of the platform main program 805. Functions of the platform main program 805 may be called to generate corresponding ones of tokens 810, settlement programs 815, and/or transaction payment programs 820 smart contracts for deployment on the CSS distributed ledger based on the occurrence of various events (e.g., receipt of a CSS claim creation request, claim update request, claim settlement request, all line items of a claim being agreed to, a claim payment request, and/or the like). In an example embodiment, the claim smart contract corresponds to the settlement program 815 illustrated in FIGS. 8 and 8A-8D.

Figure 8A:
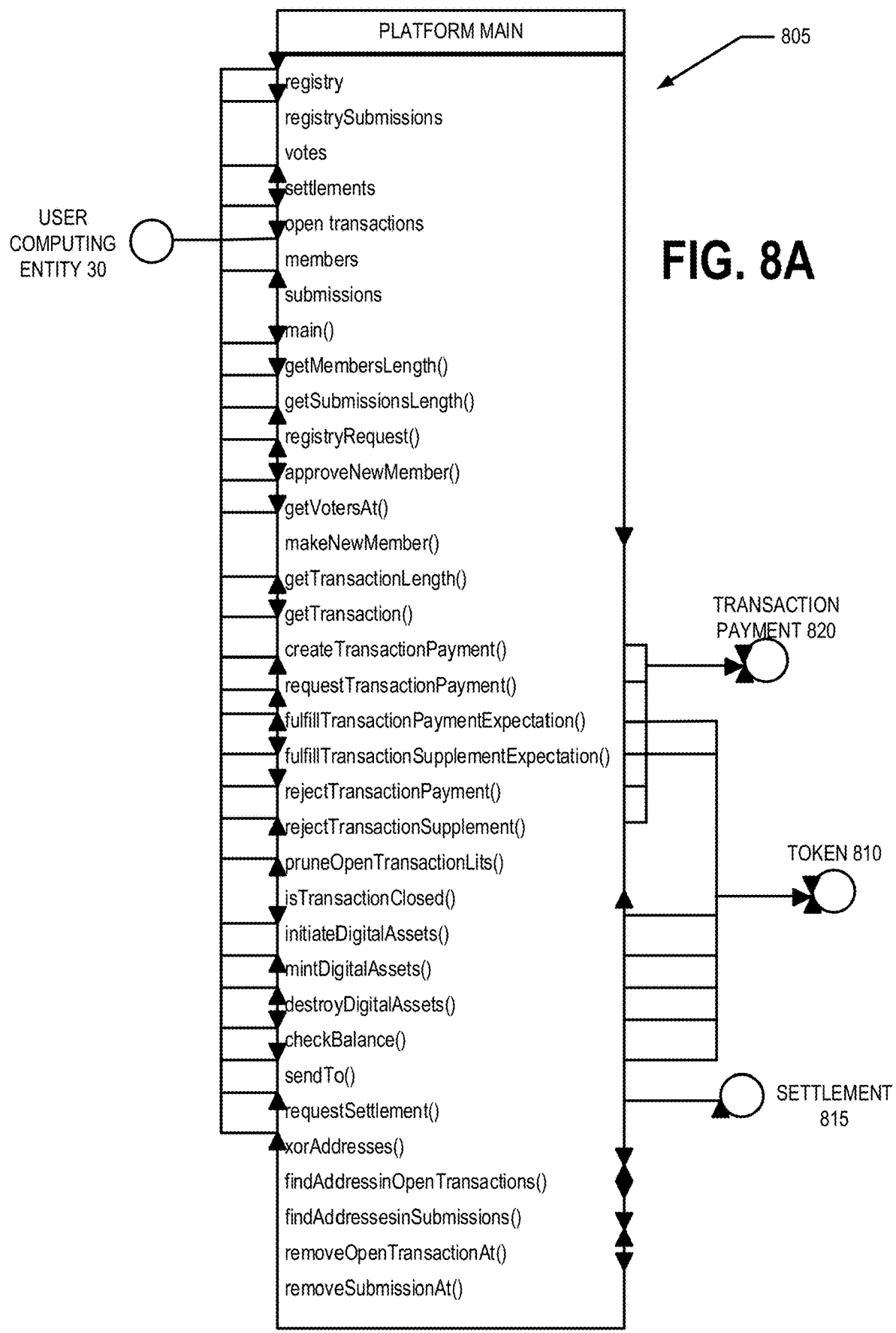

The platform main program 805 may comprise computer-executable program code corresponding to and/or configured for the storing and maintenance of a registry such as the CSS distributed ledger data structure; handling of submissions to the registry (e.g., interparty transaction requests, input negotiating one or more lines items of an interparty transaction, payment and/or settlement of an interparty transaction, and/or the like); for submitting a vote, tallying votes, and/or storing a voting history corresponding to the registry (e.g., CSS distributed ledger data structure); for performing settlements and/or storing information/data corresponding to one or more settlements; managing open interparty transactions (e.g., open CSS claims); storing member information/data, adding new members, and/or managing members and/or member accounts; receiving and processing various submissions; and/or the like. FIG. 8A illustrates various functions that may be called and/or performed via the execution of the computer-executable program code portions of the platform main program 805 and/or that are defined by the platform main program 805 and the inputs and outputs of such functions in association with the one or more tokens 810, settlement program 815, and transaction payment program 820, and a user computing entity 30.

Figure 8B:
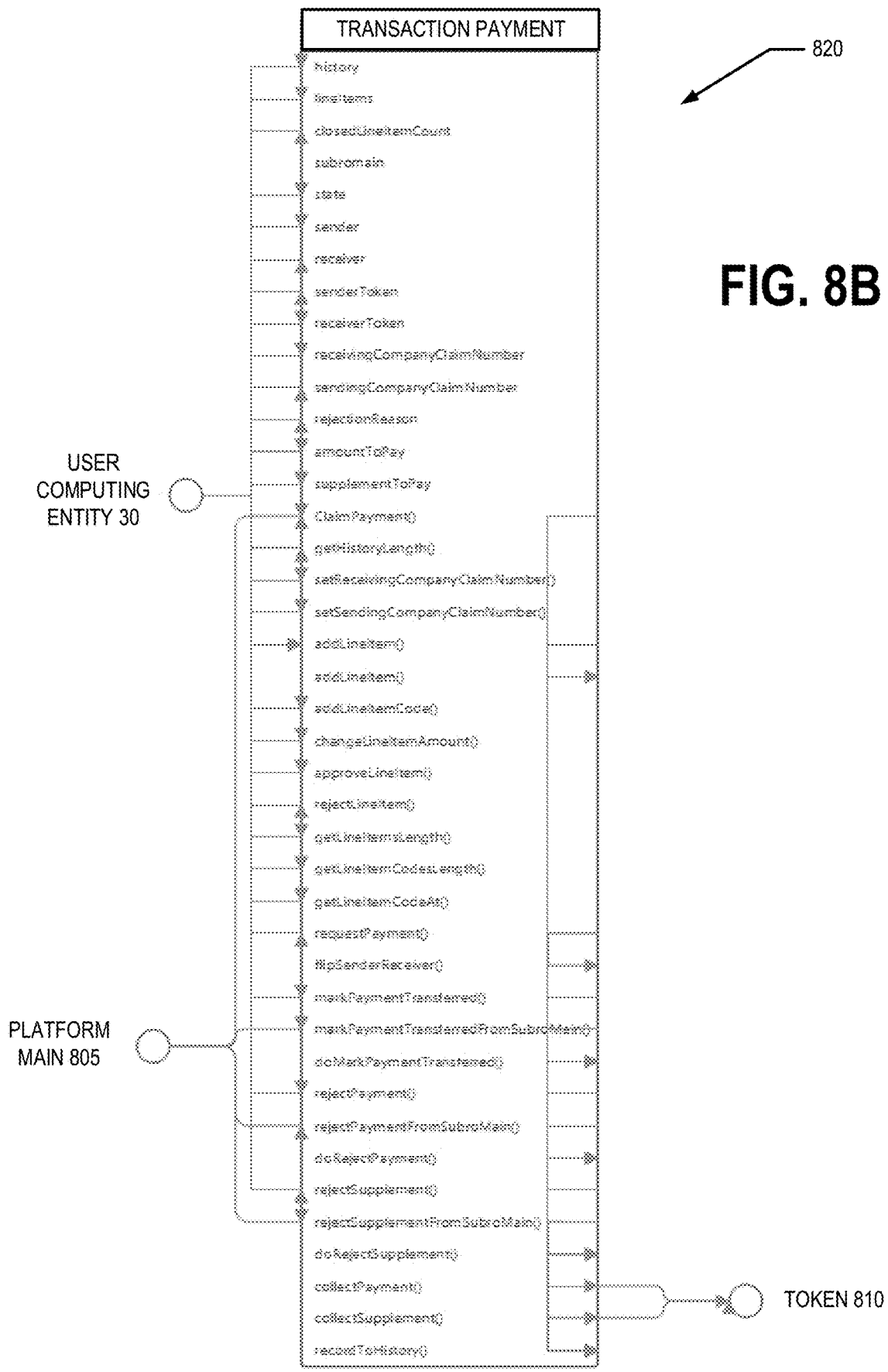

The transaction payment program 820 may comprise computer-executable program code and/or information/data corresponding to a state of the payment of the transaction, a sender of the funds, a receiver of the funds, and/or the like. FIG. 8B illustrates various functions that may be called and/or performed via the execution of the computer-executable program code portions of the transaction payment program 820 and the inputs and outputs of such functions in association with the platform main program 805, one or more tokens 810, and a user computing entity 30.

Figure 8C:
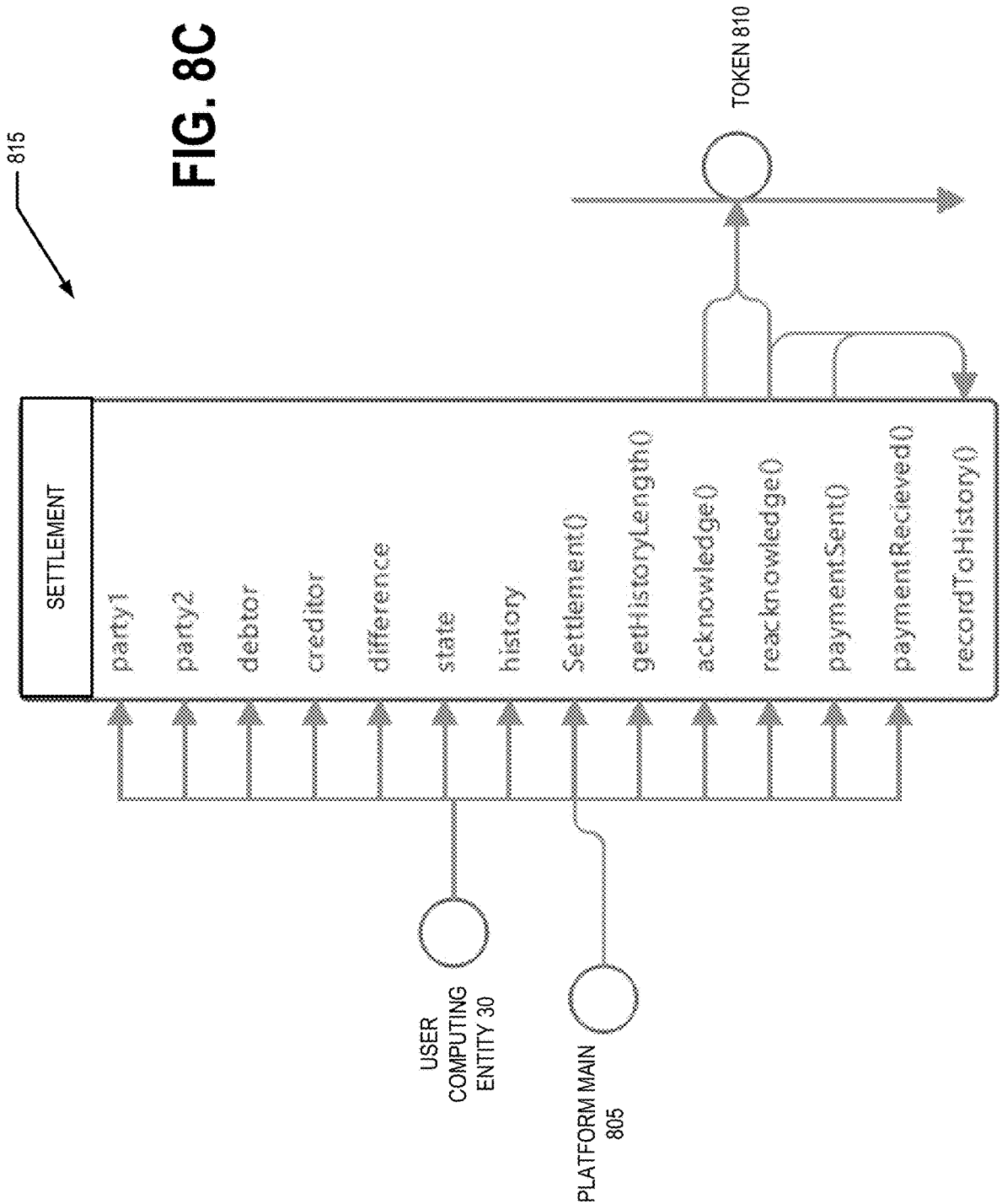

The settlement program 815 may comprise computer-executable program code and/or information/data corresponding to settling an interparty transaction, such as a CSS claim. For example, the settlement program 815 may comprise computer-executable program code and/or information/data corresponding to the state of an interparty transaction undergoing settlement, a creditor of the interparty transaction, a debtor of the interparty transaction, and a difference (e.g., amount owed by the debtor to the creditor based on, for example, one or more line items of the interparty transaction). FIG. 8C illustrates various functions that may called and/or performed via the execution of the computer-executable program code portions of the settlement program 815 and the inputs and outputs of such function in association with the platform main program 805, one or more tokens 810, and a user computing entity 30.

Figure 8D:
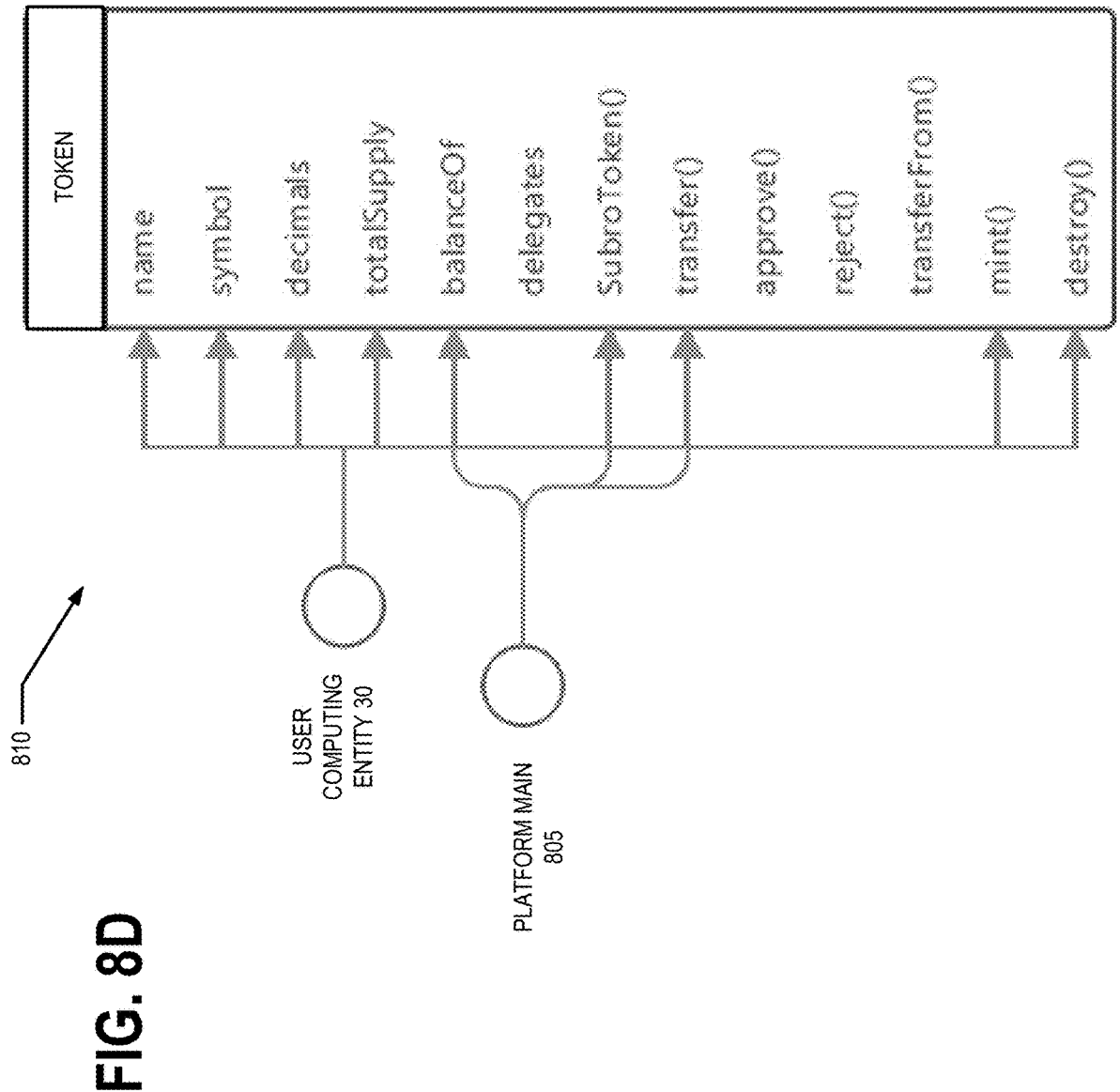

A token 810 may be a data storage object for storing digital assets (e.g., cryptocurrency) and/or may comprise computer-executable program code configured to, when executed by a processor (e.g., processing element 12) perform one or more functions corresponding to digital assets. For example, a token 810 may comprise a name, a symbol indicating the type of digital asset stored thereby, and a balance of the token. In an example embodiment, a token 810 may be associated with a particular member. In an example embodiment, a token 810 may be transferred from association with a first member (e.g., debtor of a transaction) and transferred to association with a second member (e.g., a creditor of a transaction) to pay and/or settle the transaction. FIG. 8D illustrates various functions that may be called and/or performed via the execution of the computer-executable program code portions of the token 810 and/or that are defined by the token 810 and the inputs and outputs of such functions in association with the platform main program 805 and a user computing entity 30.

Technical Advantages

Various embodiments of the present invention provide for the automated generation and execution of interparty transactions via a distributed ledger (e.g., blockchain) data structure. In various embodiments, such execution of interparty transactions may include the exchange of digital assets (e.g., cryptocurrencies) and/or other value. Example embodiments are described herein with respect to CSS claims; however, various embodiments of the present invention are not limited to CSS claims. Various embodiments provide a user-friendly interface for initiating the interparty transaction that does not require a user to be skilled in coding in order to generate an appropriate smart contract for executing the contract. Thus, various embodiments provide a specific improvement over prior systems, resulting in an improved user interface for electronic devices.

Additionally, various embodiments provide a platform main program that comprises the code elements (e.g., as bytecode) of the claim/settlement smart contracts, tokens, payment smart contracts, and/or the like. These smart contracts may be provided as libraries, sub-classes, classes, and/or the like of the platform main program. Such an embodiment provides the advantage of efficient, automated, and tailored smart contract generation for representing a CSS claim (and/or other transaction) and payment of such a claim while avoiding possible compilation issues and the time and processing power necessary for compiling a smart contract. Such an embodiment further avoids complications cause by needing to provide, deploy, and/or keep up to date an interface (e.g., application programming interface (API), application binary interface (ABI), and/or the like) for the platform main program to use in accessing the smart contract code used to build a smart contract representing a particular CSS claim. Thus, various embodiments provide an improved deployment by integrating the code elements (e.g., as bytecode) of the claim/settlement smart contracts, tokens, payment smart contracts, and/or the like into the platform main program.

V. CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A node computing entity of a distributed ledger system comprising a communications interface configured to communicate via one or more networks, at least one processor and at least one memory including program code, the at least one memory and the program code configured to, with the at least one processor, cause the node computing entity to at least:

receive, via the communications interface, an interparty transaction request, the interparty transaction request corresponding to an interparty transaction and identifying a first party and a second party, the first party and the second party being members of the distributed ledger system;

identify a plurality of selected pre-compiled elements of smart contract code from a plurality of available pre-compiled elements of smart contract code by identifying pre-compiled elements of smart contract code of the plurality of available pre-compiled elements that are associated with meta-data matching a respective element of the interparty transaction request, wherein (a) the plurality of selected pre-compiled elements of smart contract code comprise a plurality of line item elements of smart contract code, and (b) each of the plurality of line item elements corresponds to a respective line element of the interparty transaction request;

generate a smart contract from the plurality of selected pre-compiled elements of smart contract code based at least in part on the interparty transaction request, by inserting one or more values read from the interparty transaction request into corresponding respective parameters of the plurality of selected pre-compiled elements, wherein (a) inserting the one or more values read from the interparty transaction request comprises reading a line item value from the interparty transaction request and inserting the line item value in a respective line item element of the plurality of line item elements of the smart contract code, and (b) each line item element of the plurality of line item elements of the smart contract code comprises a first party approval flag and a second party approval flag and wherein the smart contract comprises (i) one or more notification clauses configured to control notification of the first party and the second party regarding at least one of generation or updating of a smart contract, (ii) the plurality of line item elements, (iii) one or more accountant clauses comprising executable code for performing one or more accountant functions based at least in part on the plurality of line item elements, and (iv) one or more closing clauses configured to control the closing of the smart contract;

store a data entry indicating the generation of the smart contract to a distributed ledger of the distributed ledger system;

execute the smart contract to cause:

a notification indicating generation of the smart contract to be provided to at least one of the first party or the second party, responsive to determining that a transaction update request was received within a specified time period:
adding, removing, or modifying at least one pre-compiled element of the smart contract based at least in part on a transaction update request received responsive to the notification, wherein modifying the at least one pre-compiled element includes modifying a parameter of the at least one pre-compiled element based at least in part on a value read from the transaction update request,
determining whether the first party approval flag and the second party approval flag of each of the plurality of line elements of smart contract code indicate both the first party and the second party have approved the respective line element,
responsive to a determination that at least one of the first party approval flag or the second party approval flag indicates a non-approval of the respective line element by a party, providing a corresponding notification to the party, and
responsive to a determination that the first party approval flag and the second party approval flag indicate approval of the respective line elements by the first party and the second party, (a) executing the one or more accountant clauses, (b) settling of the interparty transaction between the first party and the second party using at least one token of the distributed ledger system associated with at least one of the first party or the second party based at least in part on a result of executing the one or more accountant clauses, and (c) executing the one or more closing clauses to resolve the interparty transaction, and responsive to determining that the transaction update request was not received with in the specified time period:
determining that both the first party and the second party have approved the respective line elements,
executing the one or more accountant clauses,
settling of the interparty transaction between the first party and the second party using at least one token of the distributed ledger system associated with at least one of the first party or the second party based at least in part on a result of executing the one or more accountant clauses, and executing the one or more closing clauses to resolve the interparty transaction; and store a data entry indicating the settlement of the interparty transaction to the distributed ledger.

2. The node computing entity of claim 1, wherein settlement of the interparty transaction comprises an exchange of digital assets from a debtor's token to a creditor's token, wherein the debtor is one of the first party or the second party and the creditor is the other of the first party or the second party.

3. The node computing entity of claim 1, wherein the distributed ledger is a blockchain data structure.

4. The node computing entity of claim 1, wherein the at least one memory and the program code are further configured to, with the at least one processor, cause the node computing entity to at least:
  receive a supplemental interparty transaction request identifying the interparty transaction;
  generate a supplemental smart contract based at least in part on the supplemental interparty transaction request and the smart contract;
  store a data entry indicating the generation of the supplemental smart contract to the distributed ledger;
  execute the supplemental smart contract to cause settlement of the interparty transaction between the first party and the second party; and
  store a data entry indicating the settlement of the interparty transaction to the distributed ledger.

5. The node computing entity of claim 1, wherein the at least one memory and the program code are further configured to, with the at least one processor, cause the node computing entity to at least:
  update the smart contract based at least in part on the negotiation of at least one line item corresponding to the respective line item element between the first party and the second party; and
  store an indication of the update to the smart contract in the distributed ledger.

6. The node computing entity of claim 1, wherein the interparty transaction is a subrogation claim.

7. The node computing entity of claim 1, wherein the at least one memory stores the plurality of elements of smart contract code as a library of a distributed ledger platform program configured to be executed by the at least one processor.

8. The node computing entity of claim 1, wherein the at least one memory and the program code are further configured to, with the at least one processor, cause the node computing entity to at least populate one or more fields of the one or more elements of smart contract code based at least in part on the interparty transaction request.

9. The node computing entity of claim 1, wherein (a) generating the smart contract from the one or more precompiled elements of smart contract code comprises setting a flag corresponding to at least one of the one or more pre-compiled elements of smart contract to on and (b) when the smart contract is executed, (i) each pre-compiled element of smart contract corresponding to a flag set to on is executed and (ii) each pre-compiled element of smart contract corresponding to a flag set to off is not executed.

10. A method for automated execution of an interparty transaction via a distributed ledger of a distributed ledger system, the method comprising:
  receiving, via a communications interface of a node computing entity of the distributed ledger system, the node computing entity comprising the communications interface, a processor, and a memory, an interparty transaction request, the interparty transaction request corresponding to an interparty transaction and identifying a first party and a second party, wherein the node computing entity is a node of the distributed ledger, the first party and the second party being members of the distributed ledger system;
  identifying, by the node computing entity, a plurality of selected pre-compiled elements of smart contract code from a plurality of available pre-compiled elements of smart contract code by identifying pre-compiled elements of smart contract code of the plurality of available pre-compiled elements that are associated with meta-data matching a respective element of the interparty transaction request, wherein (a) the plurality of selected pre-compiled elements of smart contract code comprise a plurality of line item elements of smart contract code, and (b) each of the plurality of line item elements corresponds to a respective line element of the interparty transaction request;
  generating, by the node computing entity, a smart contract from the plurality of selected pre-compiled elements of smart contract code based at least in part on the interparty transaction request, by inserting one or more values read from the interparty transaction request into corresponding respective parameters of the plurality of selected pre-compiled elements, wherein (a) inserting the one or more values read from the interparty transaction request comprises reading a line item value from the interparty transaction request and inserting the line item value in a respective line item element of the plurality of line item elements of the smart contract code, and (b) each line item element of the plurality of line item elements of the smart contract code comprises a first party approval flag and a second party approval flag and wherein the smart contract comprises (i) one or more notification clauses configured to control notification of the first party and the second party regarding at least one of generation or updating of a smart contract, (ii) the plurality of line item elements, (iii) one or more accountant clauses comprising executable code for performing one or more accountant functions based at least in part on the plurality of line item elements, and (iv) one or more closing clauses configured to control the closing of the smart contract;
  storing, by the node computing entity, a data entry indicating the generation of the smart contract to the distributed ledger of the distributed ledger system;
  executing, by the node computing entity, the smart contract to cause:
    a notification indicating generation of the smart contract to be provided to at least one of the first party or the second party,
    responsive to determining that a transaction update request was received within a specified time period:
      adding, removing, or modifying at least one pre-compiled element of the smart contract based at least in part on a transaction update request received responsive to the notification, wherein modifying the at least one pre-compiled element includes modifying a parameter of the at least one pre-compiled element based at least in part on a value read from the transaction update request,
      determining whether the first party approval flag and the second party approval flag of each of the plurality of line elements of smart contract code indicate both the first party and the second party have approved the respective line element, responsive to a determination that at least one of the first party approval flag or the second party approval flag indicates a non-approval of the respective line element by a party, providing a corresponding notification to the party, and responsive to a determination that the first party approval flag and the second party approval flag indicate approval of the respective line elements by the first party and the second party, (a) executing the one or more accountant clauses, (b) settling of the interparty transaction between the first party and the second party using at least one token of the distributed ledger system associated with at least one of the first party or the second party based at least in part on a result of executing the one or more accountant clauses, and (c) executing the one or more closing clauses to resolve the interparty transaction, and responsive to determining that the transaction update request was not received with in the specified time period:

determining that both the first party and the second party have approved the respective line elements, executing the one or more accountant clauses, settling of the interparty transaction between the first party and the second party using at least one token of the distributed ledger system associated with at least one of the first party or the second party based at least in part on a result of executing the one or more accountant clauses, and executing the one or more closing clauses to resolve the interparty transaction; and storing, by the node computing entity, a data entry indicating the settlement of the interparty transaction to the distributed ledger.

11. The method of claim 10, wherein settlement of the interparty transaction comprises an exchange of digital assets from a debtor's token to a creditor's token, wherein the debtor is one of the first party or the second party and the creditor is the other of the first party or the second party.

12. The method of claim 10, wherein the distributed ledger is a blockchain data structure.

13. The method of claim 10, further comprising:
receiving a supplemental interparty transaction request identifying the interparty transaction;
generating a supplemental smart contract based at least in part on the supplemental interparty transaction request and the smart contract;
storing a data entry indicating the generation of the supplemental smart contract to the distributed ledger;
executing the supplemental smart contract to cause settlement of the interparty transaction between the first party and the second party; and
storing a data entry indicating the settlement of the interparty transaction to the distributed ledger.

14. The method of claim 10, further comprising:
updating the smart contract based at least in part on the negotiation of at least one line item corresponding to the respective line item element between the first party and the second party; and
storing an indication of the update to the smart contract in the distributed ledger.

15. The method of claim 10, wherein the interparty transaction is a subrogation claim.

16. A computer program product comprising at least one non-transitory computer-readable storage medium having computer-readable program code portions stored therein, the computer-readable program code portions comprising executable portions configured to cause a node computing entity of a distributed ledger system to:

receive, via a communications interface, an interparty transaction request, the interparty transaction request corresponding to an interparty transaction and identifying a first party and a second party, the first party and the second party being members of the distributed ledger system;

identify a plurality of selected pre-compiled elements of smart contract code from a plurality of available pre-compiled elements of smart contract code by identifying pre-compiled elements of smart contract code of the plurality of available pre-compiled elements that are associated with meta-data matching a respective element of the interparty transaction request, wherein (a) the plurality of selected pre-compiled elements of smart contract code comprise a plurality of line item elements of smart contract code, and (b) each of the plurality of line item elements corresponds to a respective line element of the interparty transaction request;

generate a smart contract from the plurality of selected pre-compiled elements of smart contract code based at least in part on the interparty transaction request, by inserting one or more values read from the interparty transaction request into corresponding respective parameters of the plurality of selected pre-compiled elements, wherein (a) inserting the one or more values read from the interparty transaction request comprises reading a line item value from the interparty transaction request and inserting the line item value in a respective line item element of the plurality of line item elements of the smart contract code, and (b) each line item element of the plurality of line item elements of the smart contract code comprises a first party approval flag and a second party approval flag and wherein the smart contract comprises (i) one or more notification clauses configured to control notification of the first party and the second party regarding at least one of generation or updating of a smart contract, (ii) the plurality of line item elements, (iii) one or more accountant clauses comprising executable code for performing one or more accountant functions based at least in part on the plurality of line item elements, and (iv) one or more closing clauses configured to control the closing of the smart contract;

store a data entry indicating the generation of the smart contract to a distributed ledger of the distributed ledger system;

execute the smart contract to cause:
a notification indicating generation of the smart contract to be provided to at least one of the first party or the second party, responsive to determining that a transaction update request was received within a specified time period:
adding, removing, or modifying at least one pre-compiled element of the smart contract based at least in part on a transaction update request received responsive to the notification, wherein modifying the at least one pre-compiled element includes modifying a parameter of the at least one pre-compiled element based at least in part on a value read from the transaction update request,
determining whether the first party approval flag and the second party approval flag of each of the plurality of line elements of smart contract code indicate both the first party and the second party have approved the respective line element, responsive to a determination that at least one of the first party approval flag or the second party approval flag indicates a non-approval of the respective line element by a party, providing a corresponding notification to the party, and responsive to a determination that the first party approval flag and the second party approval flag indicate approval of the respective line elements by the first party and the second party, (a) executing the one or more accountant clauses, (b) settling of the interparty transaction between the first party and the second party using at least one token of the distributed ledger system associated with at least one of the first party or the second party based at least in part on a result of executing the one or more accountant clauses, and (c) executing the one or more closing clauses to resolve the interparty transaction, and responsive to determining that the transaction update request was not received with in the specified time period:

determining that both the first party and the second party have approved the respective line elements, executing the one or more accountant clauses, settling of the interparty transaction between the first party and the second party using at least one token of the distributed ledger system associated with at least one of the first party or the second party based at least in part on a result of executing the one or more accountant clauses, and executing the one or more closing clauses to resolve the interparty transaction; and store a data entry indicating the settlement of the interparty transaction to the distributed ledger.

17. The computer program product of claim 16, wherein the computer-readable program code portions further comprise executable portions configured to:

receive a supplemental interparty transaction request identifying the interparty transaction;

generate a supplemental smart contract based at least in part on the supplemental interparty transaction request and the smart contract;

store a data entry indicating the generation of the supplemental smart contract to the distributed ledger;

execute the supplemental smart contract to cause settlement of the interparty transaction between the first party and the second party; and store a data entry indicating the settlement of the interparty transaction to the distributed ledger.

18. The computer program product of claim 16, wherein the computer-readable program code portions further comprise executable portions configured to:

update the smart contract based at least in part on the negotiation of at least one line item corresponding to the respective line item element between the first party and the second party; and store an indication of the update to the smart contract in the distributed ledger.

\* \* \* \* \*